US012492144B2

(12) United States Patent
Ritzberger et al.

(10) Patent No.: US 12,492,144 B2
(45) Date of Patent: Dec. 9, 2025

(54) METHOD FOR MANUFACTURING A MULTI-COLOR DENTAL RESTORATION

(71) Applicant: Ivoclar Vivadent AG, Schaan (LI)

(72) Inventors: Christian Ritzberger, Grabs (CH); Marc Dittmer, Feldkirch (AT); Markus Rampf, Seewis-Dorf (CH); Christian Niedrig, Azmoos (CH)

(73) Assignee: Ivoclar Vivadent AG, Schaan (LI)

( * ) Notice: Subject to any disclaimer, the term of this patent is extended or adjusted under 35 U.S.C. 154(b) by 405 days.

(21) Appl. No.: 17/757,117

(22) PCT Filed: Dec. 22, 2020

(86) PCT No.: PCT/EP2020/087636
§ 371 (c)(1),
(2) Date: Jun. 9, 2022

(87) PCT Pub. No.: WO2021/136726
PCT Pub. Date: Jul. 8, 2021

(65) Prior Publication Data
US 2023/0012752 A1 Jan. 19, 2023

(30) Foreign Application Priority Data
Dec. 30, 2019 (EP) ..................... 19220016

(51) Int. Cl.
C03C 23/00 (2006.01)
A61K 6/15 (2020.01)
A61K 6/822 (2020.01)
A61K 6/833 (2020.01)
A61K 6/838 (2020.01)
C03C 3/097 (2006.01)
C03C 3/11 (2006.01)
C03C 4/00 (2006.01)
C03C 4/02 (2006.01)
C03C 4/04 (2006.01)
C03C 10/00 (2006.01)
C03C 10/16 (2006.01)

(52) U.S. Cl.
CPC ............. C03C 23/002 (2013.01); A61K 6/15 (2020.01); A61K 6/822 (2020.01); A61K 6/833 (2020.01); A61K 6/838 (2020.01); C03C 3/097 (2013.01); C03C 3/11 (2013.01); C03C 4/0021 (2013.01); C03C 4/02 (2013.01); C03C 4/04 (2013.01); C03C 10/0027 (2013.01); C03C 10/16 (2013.01); C03C 23/007 (2013.01); C03C 2204/04 (2013.01)

(58) Field of Classification Search
CPC ... C03C 10/0027; C03C 3/097; C03C 4/0021; C03C 23/002; C03C 23/003; C03C 4/02; C03C 4/04; A61C 13/0022; A61K 6/08
See application file for complete search history.

(56) References Cited

U.S. PATENT DOCUMENTS

| 2,628,160 | A | | 2/1953 | Stookey |
| 2,971,853 | A | | 2/1961 | Works |
| 4,208,573 | A | | 6/1980 | Risse |
| 4,480,044 | A | | 10/1984 | McAlinn |
| 4,645,649 | A | | 2/1987 | Nagao |
| 5,062,877 | A | | 11/1991 | Borrelli et al. |
| 5,094,619 | A | | 3/1992 | McLaughlin |
| 5,135,666 | A | | 8/1992 | Lucas |
| 5,162,130 | A | * | 11/1992 | McLaughlin .......... A61K 6/887 264/494 |
| 5,547,635 | A | | 8/1996 | Duthie, Jr. |
| 5,698,020 | A | * | 12/1997 | Salz ........................ A61K 6/77 106/35 |
| 7,262,144 | B2 | | 8/2007 | Schreder et al. |
| 7,829,489 | B2 | | 11/2010 | Borrelli et al. |
| 8,047,021 | B2 | | 11/2011 | Schweiger et al. |
| 8,721,336 | B2 | | 5/2014 | Rheinberger et al. |
| 9,949,808 | B2 | | 4/2018 | Wolz |
| 10,617,495 | B2 | | 4/2020 | Korten et al. |
| 11,408,629 | B2 | | 8/2022 | Lee |
| 2004/0180773 | A1 | * | 9/2004 | Schreder ............ G02B 6/12002 501/7 |
| 2005/0263719 | A1 | | 12/2005 | Ohdaira |
| 2006/0147339 | A1 | | 7/2006 | Hunter |
| 2006/0261503 | A1 | | 11/2006 | Sago et al. |
| 2009/0246739 | A1 | | 10/2009 | Jussel et al. |
| 2012/0012577 | A1 | | 1/2012 | Jussel et al. |

(Continued)

FOREIGN PATENT DOCUMENTS

| CN | 109896729 A | 6/2019 |
| DE | 102005003595 A1 | 7/2006 |

(Continued)

OTHER PUBLICATIONS

Wikipedia, Effect Definition and Meaning—Merriam-Webster, Apr. 30, 2025, 3/3 pages.

Primary Examiner — Alison L Hindenlang
Assistant Examiner — Steven S Lee
(74) Attorney, Agent, or Firm — Ann M. Knab; Thad McMurray

(57) ABSTRACT

A process for the preparation of multi-coloured dental restorations is described, in which glasses and glass ceramics with various compositions are given the shapes of dental restorations and colour changes are effected in the glasses and glass ceramics by irradiating them with artificial electromagnetic radiation and subjecting them to a heat treatment.

22 Claims, No Drawings

(56) References Cited

U.S. PATENT DOCUMENTS

| | | | |
|---|---|---|---|
| 2012/0309607 A1* | 12/2012 | Durschang | A61K 6/824 |
| | | | 501/71 |
| 2013/0149433 A1 | 6/2013 | Ehrt | |
| 2013/0270445 A1 | 10/2013 | Gaska et al. | |
| 2013/0295523 A1* | 11/2013 | Durschang | A61K 6/822 |
| | | | 252/301.4 F |
| 2014/0113237 A1 | 4/2014 | Rohner | |
| 2014/0141960 A1* | 5/2014 | Borczuch-Laczka | |
| | | | C03C 23/0005 |
| | | | 501/63 |
| 2014/0200129 A1* | 7/2014 | Durschang | A61K 6/824 |
| | | | 65/33.2 |
| 2014/0223965 A1 | 8/2014 | Ritzberger | |
| 2014/0231408 A1 | 8/2014 | Jussel | |
| 2014/0252272 A1* | 9/2014 | Durschang | A61K 6/836 |
| | | | 106/35 |
| 2014/0326932 A1* | 11/2014 | Akiyama | C09K 11/602 |
| | | | 252/586 |
| 2014/0339216 A1 | 11/2014 | Jussel | |
| 2014/0370464 A1* | 12/2014 | Kounga | A61C 13/0022 |
| | | | 427/2.26 |
| 2015/0140274 A1* | 5/2015 | Burke | C03C 3/085 |
| | | | 264/19 |
| 2015/0374589 A1* | 12/2015 | Rampf | A61K 6/833 |
| | | | 501/63 |
| 2016/0057816 A1 | 2/2016 | Alias | |
| 2016/0257607 A1* | 9/2016 | Ritzberger | C03C 4/0021 |
| 2016/0304390 A1* | 10/2016 | Mikami | G02B 1/00 |
| 2016/0340228 A1 | 11/2016 | Schreder et al. | |
| 2017/0088456 A1* | 3/2017 | Rampf | C03C 10/0027 |
| 2017/0144919 A1 | 5/2017 | Krolikowski et al. | |
| 2017/0156828 A1 | 6/2017 | Leeson | |
| 2017/0210665 A1* | 7/2017 | Beall | C03C 23/007 |
| 2017/0355636 A1* | 12/2017 | Borrelli | C03C 3/095 |
| 2018/0009701 A1* | 1/2018 | Rampf | A61K 6/833 |
| 2018/0244563 A1* | 8/2018 | Dittmer | C03C 10/0027 |
| 2018/0256297 A1* | 9/2018 | Vollmann | C03C 10/0009 |
| 2018/0290913 A1* | 10/2018 | Gödiker | C03B 32/02 |
| 2019/0167395 A1 | 6/2019 | Baholzer | |
| 2019/0217534 A1 | 7/2019 | Verboomen | |
| 2020/0000563 A1 | 1/2020 | Specht et al. | |
| 2022/0318520 A1 | 10/2022 | Pouran Ben Veyseh et al. | |
| 2022/0318683 A1 | 10/2022 | Sawaf | |
| 2023/0119981 A1 | 4/2023 | Niedrig | |
| 2023/0121316 A1 | 4/2023 | Rampf | |
| 2023/0125010 A1 | 4/2023 | Ritzberger | |

FOREIGN PATENT DOCUMENTS

| | | | | |
|---|---|---|---|---|
| FR | 2507296 A1 | 12/1982 | | |
| JP | 3203603 U | 4/2016 | | |
| WO | 2004051716 A1 | 6/2004 | | |
| WO | 2011113568 A1 | 9/2011 | | |
| WO | 2012057252 A1 | 5/2012 | | |
| WO | WO-2018162055 A1 * | 9/2018 | | A61C 13/0004 |
| WO | 2021048733 A1 | 3/2021 | | |

\* cited by examiner

METHOD FOR MANUFACTURING A MULTI-COLOR DENTAL RESTORATION

CROSS-REFERENCE TO RELATED APPLICATIONS

This application is a National Stage application of International patent application No. PCT/EP2020/087636 filed on Dec. 22, 2020, which claims priority to European patent application No. 19220016.0 filed on Dec. 30, 2019, all the disclosures of which are incorporated herein by reference in their entirety.

FIELD OF THE INVENTION

The invention relates to a process for the preparation of a multi-coloured dental restoration, in which a colour change is effected in a glass or a glass ceramic.

BACKGROUND

Glass ceramics, such as lithium silicate glass ceramics, are typically characterized by very good mechanical properties and are therefore widely used as material for the preparation of dental restorations.

Various methods for shaping, such as for example pressing processes, sintering or machining, are used in order to produce dental restorations from glass ceramic. Shaping by means of CAD/CAM processes, in which a digital model of the desired dental restoration is first created in a computer-assisted process (computer-aided design), has proved to be particularly advantageous. Then, the desired dental restoration is typically manufactured on the basis of this model by machining, in particular by milling and grinding, in a likewise computer-assisted process (computer-aided manufacturing).

Glass ceramics are generally also suitable for the production of dental restorations because of their advantageous optical properties, such as for example a high translucency.

Typically, a dentist or a dental technician selects the colour and translucency suitable for a patient from a stock of blanks. It is not possible, though, for the dentist or dental technician to hold blanks available for all naturally occurring colour values and translucency grades. However, a large selection should be held available in order to keep the deviations in the colour and translucency between natural tooth and dental restoration small.

Natural teeth, though, have complex colourings with colour gradients and 3D colour effects. In order for the dental restoration in a patient's set of teeth to be indistinguishable from the surrounding natural tooth material, it is necessary, in particular in the region of the front teeth, to imitate the complex colouring of the natural teeth for the respective patient as realistically as possible.

For example, single-coloured dental restorations can be given the desired optical properties by a subsequent veneering. For example, using the cut-back technique, a body with the shape of a natural dentine core can first be milled out of a fully anatomical crown. Where necessary, differently coloured material layers, which normally also have a higher translucency, can be applied to this body, which normally has a low translucency. In this way, a dental restoration can be obtained which meets high aesthetic demands. However, a disadvantage is that the process is very complex, and in addition the result is heavily dependent on the skills of the dental technician. It would be desirable to provide a simpler colouring process which makes an individual coloration of the dental restoration for high aesthetic demands possible. In addition, the process should be quick and efficient to carry out, and capable of being automated, and the result should be less dependent on the technical skills of the dental technician than in the case of previously used processes.

It is also possible to paint a single-coloured dental restoration such that the colouring resembles a natural tooth. Like in the cut-back technique, in this process the result is also heavily dependent on the skills of the dental technician. Another disadvantage is that no 3D colour effects can normally be achieved when the dental restoration is painted, as the colour is only applied to the surface of the restoration. The typical translucency gradient of natural teeth also cannot be imitated by painting. For these reasons, the aesthetic result of painted dental restorations is usually unsatisfactory in particular in the case of those which are to be used in the region of the front teeth.

In the light of the described difficulties, various processes for the preparation of multi-coloured dental restorations with realistic colouring have been developed.

EP 1 900 341 A1 describes multi-coloured shaped bodies which are produced from differently coloured layers, in which the colour transitions between the layers are not perceptible. Multi-coloured shaped bodies, from which multi-coloured dental restorations can be manufactured in CAD/CAM processes, are produced by dry pressing of correspondingly coloured glass ceramic powders layered on each other, debinding and sintering. For the production of an individually coloured dental restoration, though, an individually layered shaped body must be produced in a complex process.

A process is known from EP 3 178 462 A1 in which a multi-coloured ceramic dental restoration is produced in that a porous ceramic body is first loaded with a colour pigment solution, and then the colour pigments are non-uniformly distributed in the ceramic by regulation of one or more environmental parameters, such as for example the humidity and/or pressure. The dental ceramic blanks produced are suitable in particular for processing by means of CAD/CAM.

WO 2013/122662 describes individually coloured milling blocks for dental use and processes for the preparation thereof. A milling block is produced in a rapid prototyping process on the basis of the colouring desired for the dental restoration to be created. A material, which can be subjected to a curing step, for example by polymerization, is built up in layers to form a milling block, wherein the individual layers can be coloured individually in the desired regions. The materials preferably used are typically based on (meth)acrylate composite materials and do not have the advantageous mechanical properties of lithium silicate glass ceramics.

EP 0 153 026 A1, DE 10 2005 003 595 A1, DE 103 04 382 A1 and US 2016/0340228 A1 describe processes for the preparation of glasses and glass ceramics, which are used as optical components, such as optical waveguides. It is disclosed that in particular a treatment of the glasses with light and heat is suitable in order either to change the refractive indices of the glasses or to form crystal nuclei in the glasses. Colorations which are, though, undesired for the use of the materials as optical waveguides have also been observed. No suggestion is to be found that these processes could yield products which could meet the extremely high demands on optical and mechanical properties for use in the dental field.

SUMMARY

Starting from the above-described disadvantages of the known processes, the object of the invention is to provide a process for the preparation of a multi-coloured dental restoration, in which a coloration can be effected in a simpler manner. Moreover, the process shall be suitable for the preparation of individually coloured dental restorations, in which colour changes are effected in a controlled manner in the material used, with the result that the dental restoration prepared has colour gradients which are modelled on the colour gradients of natural tooth material. The process should be capable of being automated, and it should preferably be capable of being combined with automated shaping processes. The multi-coloured dental restoration prepared using the process should furthermore have an advantageous translucency and advantageous mechanical properties, such as a high strength and fracture toughness, and should also be chemically resistant and biocompatible.

This object is achieved by the process according to the claim 4. The invention is also directed to the multi-coloured dental restoration according to the claims.

DETAILED DESCRIPTION

The process according to the invention for the preparation of a multi-coloured dental restoration is characterized in that
a) a glass or a glass ceramic is given the shape of a dental restoration, and
b) in at least one part of the glass or the glass ceramic a colour change is effected by irradiating this part with artificial electromagnetic radiation and subjecting this irradiated part to a heat treatment.

It has surprisingly been shown that the process according to the invention makes the simple preparation of multi-coloured dental restorations possible, wherein the polychromatism can be effected in a targeted manner inside a glass or a glass ceramic, such as a lithium silicate glass or a lithium silicate glass ceramic. In addition, it has surprisingly been found out that continuous colour gradients can be produced. As, unlike in many conventional processes, the application of colouring materials is not responsible for the colour change, but a colour change is effected in the glass and the glass ceramic, even 3D colour gradients can be achieved.

Moreover, the process surprisingly allows a simple colour choice and colouring which are also capable of being automated and adapted to the individual needs. Known automated processes for shaping, such as CAD/CAM processes, can be included, whereby a comprehensive digitization of the design and preparation of individually shaped and individually coloured dental restorations can be achieved. In comparison with conventional processes, such as the painting of dental restorations or the cut-back process, such a high degree of digitization and automation makes a quick and precise preparation possible, in which the aesthetics of the result are not much dependent on the technical skills of the person in charge of the preparation.

The process is also advantageous in relation to the storage and logistics of the starting materials for the dentist or dental technician. According to the invention, the desired coloration of dental restorations can be achieved from a few different starting materials, in particular a few types of blanks. It is, therefore, no longer necessary for a dentist or dental technician to hold blanks or raw materials available in many commercially available colour values and translucency grades, or to order them as needed. Instead, it can be sufficient for the normal needs of a dentist or a dental technician to hold blanks with only one colour value available in various translucency grades.

There is a "colour change" effected according to the invention if an irradiated and heat-treated part of the glass or the glass ceramic after step b) has been carried out differs from the part before step b) is carried out in at least one of colour value, lightness and translucency, preferably in at least one of colour value and lightness. The terms "colour" and "coloured" thus relate to the colour value, the lightness and the translucency of a material.

Colour values and lightnesses can be characterized by the L*a*b value, in particular as determined according to DIN 6174, or by a shade guide common in the dental industry. The colour measurement can be carried out with measuring devices customary in the trade, such as a CM-3700d spectrophotometer (Konica Minolta). Examples of shade guides are Vitapan Classical® and Vita 3D Master®, both from VITA Zahnfabrik H. Rauter GmbH & Co. KG, and Chromascop® from Ivoclar Vivadent AG.

The "translucency" is the light transmission of a material, i.e. the ratio of transmitted to incident light intensity. The translucency can be determined in the form of the contrast value (CR value) according to British Standard 5612.

Substantially every colour desired for the preparation of dental restorations can be effected by the process according to the invention. In particular, desired yellow shades (b* values) and red shades (a* values) can be effected in a controlled manner. Processes for defining desired material colours in the preparation of dental restorations are known from the state of the art, e.g. from WO 2018/162671.

It is preferred that a colour achieved by the colour change according to step b) has a b* value of at least 4.00 and an a* value of at least −1.00, as determined according to DIN 6174. Moreover, it is preferred that the colour achieved by the colour change has a b* value of not more than 40.00 and an a* value of not more than 25.00, as determined according to DIN 6174.

In a preferred embodiment a red colouring is effected in at least one part of the glass or the glass ceramic and a red colouring in at least one other part of the glass or the glass ceramic.

It is furthermore possible to combine the colour change according to step b) of the process according to the invention with other colouring processes for the preparation of dental restorations, such as colouring by ions or the use of colouring pigments.

It is particularly preferred that the glass and the glass ceramic used in the process according to the invention comprise at least one oxidizable component and at least one reducible colouring component.

The term "oxidizable component" denotes a component which can be oxidized by irradiation of the glass and the glass ceramic in step b). Preferred oxidizable components are cerium ions, europium ions, erbium ions, copper ions and mixtures thereof, in particular cerium ions. $Ce^{3+}$ is particularly preferably the oxidizable component.

In a preferred embodiment of the process according to the invention, the glass and the glass ceramic comprise Ce, calculated as $CaO_2$, preferably in an amount of 0.01 to 1.5, in particular 0.03 to 1 wt.-%. According to the invention, "Ce" denotes all oxidation states of cerium present in the glass and in the glass ceramic.

Ce can be detected by means of UV/Vis spectroscopy. A quantification of the $Ce^{3+}$ content is possible by means of fluorescence spectroscopy. The $Ce^{4+}$ content in the glass and the glass ceramic can be determined taking into account the amount of Ce used for the glass production and the $Ce^{3+}$ content determined.

The term "reducible colouring component" denotes a component which can be reduced accompanied by a colour change. Preferred reducible colouring components are cations of metals, such as for example of Ag, Au, Cu, or combinations thereof, particularly preferably cations of Ag and/or Au.

The metals, such as Ag and Au, can be present in different oxidation states in the glass and in the glass ceramic.

Without further designation, according to the invention the terms "Ag" and "Au" relate to all oxidation states of these metals present in the glass and in the glass ceramic, preferably to the oxidation states 0 and 1.

In a preferred embodiment of the process according to the invention, the glass and the glass ceramic comprise Ag, calculated as $Ag_2O$, preferably in an amount of 0.0005 to 1.3, in particular 0.002 to 0.7 wt.-%.

In a further preferred embodiment, the glass and the glass ceramic comprise Au, calculated as $Au_2O$, preferably in an amount of 0.0001 to 0.65, in particular 0.0003 to 0.25, particularly preferably 0.003 to 0.2 wt.-%.

In a particularly preferred embodiment of the process according to the invention, the glass and the glass ceramic comprise Ce as well as Ag and/or Au.

If Ce and Ag are present in the glass and in the glass ceramic, in particular a yellow colouring can be effected in step b). If Ce and Au are present in the glass and in the glass ceramic, in particular a red colouring can be effected in step b). If Ce, Ag and Au are present in the glass and in the glass ceramic, in particular a yellow colouring and a red colouring can be effected in step b).

The amounts of Ce, Ag and Au in the glass and in the glass ceramic, in particular the amounts of Ag and Au, can influence the colour achieved by the colour change. It has been found out that a more intense colour can usually be effected through the use of a larger amount of Ag and/or Au.

Without being limited to one theory, it is assumed that the irradiation in step b) makes a redox reaction possible, in which the oxidizable component can be oxidized and the reducible colouring component can be reduced.

If e.g. Ce and Ag are present in the glass and in the glass ceramic, it is assumed that the electromagnetic radiation makes a reaction according to the following equation possible:

$$Ce^{3+}+Ag^+ \rightarrow Ce^{4+}+Ag^0$$

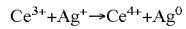

It has been shown that the heat treatment of the irradiated glass or the irradiated glass ceramic from step b) can lead to the formation of particles with reduced colouring component or to the accumulation of such particles which already exist. These particles can be present in particular as a "cluster" or "colloid" and contribute to the colour of the glass and the glass ceramic. Such particles can be detected e.g. by means of transmission electron microscopy (TEM).

It has been found out e.g. that particles with Ag typically effect a yellow colouring and particles with Au typically effect a red colouring in the glass and in the glass ceramic.

In a further preferred embodiment, the glass and the glass ceramic in which a colour change is effected in step b) comprise Ag halides, such as AgCl, AgBr and/or AgI. Such Ag halides can as a rule be detected qualitatively, for example by means of NMR spectroscopy, transmission electron microscopy or Raman spectroscopy.

In a preferred embodiment, the glass and the glass ceramic comprise Cl, Br and/or I, in particular Cl, in an amount of 0.0001 to 0.9, particularly preferably 0.0005 to 0.7 wt.-%. Usually, Cl, Br and I are present in ionic form, preferably in the oxidation state −1, in the glass and in the glass ceramic. These halides usually originate from halides used as starting materials, such as Ag halides or Cu halides.

In a further preferred embodiment, the glass and the glass ceramic in which a colour change is effected in step b) comprise 0.01 to 1.5 wt.-% Ce, calculated as $CeO_2$, 0.0005 to 1.3 wt.-% Ag, calculated as $Ag_2O$, 0.06 to 0.5 wt.-% Sb, calculated as $Sb_2O_3$, as well as 0.01 to 0.15 wt.-% Sn, calculated as SnO. This preferred glass and this preferred glass ceramic can be given a yellow and a red colouring, wherein typically a higher Sb content effects a more intense red colouring.

To effect a colour change, the glass and the glass ceramic are first irradiated in step b) with artificial electromagnetic radiation. By "artificial electromagnetic radiation" is meant according to the invention a radiation emitted by an artificial radiation source.

The radiation with which the glass and the glass ceramic are irradiated can comprise portions with different wavelengths. It is sufficient for the process according to the invention if a portion of the entire radiation is suitable for bringing about a colour change.

In a preferred embodiment, the glass and the glass ceramic are irradiated with X-radiation. The X-radiation source used preferably has an anode material selected from the group consisting of Cu, Co, Cr, Fe or Mo, in particular Cu. The irradiating can be effected with X-ray energies of different spectral lines. The irradiating is preferably effected with K-α radiation.

In a further preferred embodiment, the glass and the glass ceramic are irradiated with UV radiation. According to the invention, "UV radiation" denotes an electromagnetic radiation with a wavelength of from 100 to 400 nm.

In a particularly preferred embodiment, the radiation has a wavelength of no more than 380 nm, in particular in the range of 100 to 360 nm, particularly preferably in the range of 250 to 350 nm, most preferably in the range of 300 to 310 nm.

It is particularly preferred that the radiation is emitted by a radiation source which has an effective irradiance in the wavelength range of from 180 to 400 nm of more than 1 $mW/m^2$, in particular more than 3 $mW/m^2$, particularly preferably more than 10 $mW/m^2$, most preferably more than 100 $mW/m^2$, determined at a distance of 20 cm from the radiation source as spectrally weighted irradiance according to DIN EN 62471:2009-03.

It is preferred to use a UV LED, a UV laser, an X-ray diffractometer or a mercury vapour lamp as radiation source in step b).

In a preferred embodiment, the wavelength of the radiation is matched to the oxidizable component present in the glass and in the glass ceramic. It has been shown e.g. that a wavelength in the region of about 310 nm is advantageous if cerium ions are present in the glass and in the glass ceramic. For copper ions, on the other hand, a wavelength of about 280 nm is advantageous.

It has been found out that the colour change achieved according to step b) is usually dependent on the conditions of the irradiation, in particular irradiation duration, irradiance and wavelength of the radiation. In particular, it has been found out that a more intense colour can typically be effected by means of a higher irradiance or a longer irradiation duration.

In an embodiment, the entire glass or the entire glass ceramic is irradiated in step b). To achieve polychromatism, different regions are usually irradiated under different conditions.

In a preferred embodiment, only parts of the glass or the glass ceramic are irradiated in step b). Although an irradiation of only parts already gives the glass or the glass ceramic polychromatism, also in this case different regions can be irradiated under different conditions.

In the irradiation of the glass and the glass ceramic small diameters of the beam can be advantageous in order to limit the colour change to small regions of the glass or the glass ceramic, and in this way to imitate fine colour gradients of the natural tooth material precisely. Large diameters of the beam, on the other hand, can be advantageous for a uniform irradiation of the glass or the glass ceramic and contribute to keeping short the time needed for the process.

In a preferred embodiment, the radiation has a defined local focus. This focus can particularly preferably also be directed at regions of the glass and the glass ceramic which do not lie on the surface of the glass and the glass ceramic. Through a focusing of the radiation or through the use of several beam paths with defined foci, it can be achieved that the colour change in the glass and the glass ceramic is effected predominantly in the focused region, whereas no or hardly any colour change is effected along the beam path in the glass and in the glass ceramic.

In order to restrict the irradiation to particular regions of the glass and the glass ceramic and/or to attenuate the radiation, templates can be used during the irradiation in step b).

To effect a colour change, at least one irradiated part of the glass or the glass ceramic is heat-treated in step b) of the process according to the invention. The heat treatment is preferably effected at a temperature in the range of 300 to 1000° C., in particular 400 to 950° C., particularly preferably 450 to 850° C.

In a preferred embodiment, the heat treatment is effected for a duration of up to 120 min, in particular up to 60 min.

It has been shown that the colour achieved in the colour change according to step b) is as a rule dependent on the conditions of the heat treatment. It has been established e.g. that a more intense and/or darker colour can usually be effected by means of a higher temperature or a longer duration. The temperature and the duration which are necessary to achieve a particular colour change usually interact with each other. In general, the duration for effecting a particular colour change can be shortened at an increased temperature, and vice versa.

The glass and the glass ceramic are typically subjected to the heat treatment in step b) in a furnace. Suitable furnaces are e.g. the Programat-type furnaces from Ivoclar Vivadent AG.

In a further preferred embodiment, the heat treatment in step b) is effected with a laser, such as a UV laser, VIS laser or an IR laser, in particular with an IR laser, which generates radiation with a wavelength greater than 5 μm, or a VIS laser, which generates radiation with a wavelength of 500 to 600 nm, particularly preferably 515 to 532 nm. The laser parameters (wavelength, pulse duration, pulse energy, continuous wave operation) are usually chosen such that the glass and the glass ceramic are heated to the temperature required for the colour change, but are not evaporated or damaged.

A heat treatment of a glass and a glass ceramic with a laser is usually effected only in selected regions of the glass and the glass ceramic, whereby the colour change can be limited to selected regions, or different regions of the glass and the glass ceramic can be subjected to a heat treatment to a different extent. Carrying out the heat treatment with a laser can be particularly advantageous in order effect complicated three-dimensional colour gradients or to change the translucency of the material.

In a preferred embodiment, the heat treatment of the irradiated glass and the irradiated glass ceramic in step b) also effects a crystallization in the glass or a further crystallization in the glass ceramic, such as the crystallization of lithium metasilicate and/or lithium disilicate. The entire duration of the process for the preparation of the dental restoration can thus be shortened in an advantageous manner.

In a further embodiment, the heat treatment in step b) is effected in addition to heat treatments which are carried out for the formation of desired crystals.

The irradiation and the heat treatment in step b) can be carried out in one step or in separate steps.

Irradiation and heat treatment are typically carried out in separate process steps. In this case, the glass and the glass ceramic are irradiated with a first radiation source and the irradiated glass and the irradiated glass ceramic are subjected to a heat treatment in a subsequent step, in particular with the aid of another device, such as a second radiation source or a furnace.

However, it can also be advantageous to carry out the irradiation and the heat treatment in one step. In this case, the irradiation and the heat treatment can be effected by different devices at the same time. Preferably, a UV laser is used for the irradiation and a furnace, a VIS laser or a UV laser is used for the heat treatment. The irradiation and the heat treatment can, however, also be carried out with one device. For this, it is typically necessary to irradiate the glass and the glass ceramic with an irradiance so high that the heat generation effected by the radiation in the glass and in the glass ceramic is sufficient to achieve a colour change.

If irradiation and heat treatment are effected in separate process steps, the heat treatment can be carried out immediately after the irradiation.

In a further preferred embodiment, on the other hand, the heat treatment is carried out in a step which does not immediately follow the irradiation. The colour change after step b) of the process according to the invention can also be effected in that the irradiated glass or the irradiated glass ceramic is stored and is subjected to a heat treatment at a later time, e.g. after several days or weeks.

In a further embodiment, in at least one part of a glass ceramic a colour change is effected by heating this part to at least 150° C., preferably 150 to 800° C., in particular 200 to 800° C., particularly preferably 300 to 700° C., and irradiating it at this temperature. This embodiment is in particular suitable to effect a yellow colouring or a red colouring in the glass ceramic.

If irradiating and heat treatment to effect a colour change, such as in particular a yellow colouring, are performed simultaneously, then the heat treatment can surprisingly be performed at lower temperatures than in embodiments in which irradiating and heat treatment are performed one after the other. The effecting of a colour change by irradiating and simultaneous heat treatment can therefore allow shorter heating and cooling times and reduce the energy consumption of the process.

Particularly preferred is an embodiment in which in at least one part of a glass ceramic a colour change is effected by first subjecting at a temperature $T_1$ this part to a first irradiating and then subjecting it at a temperature $T_2$ to a first heat treatment, and then subjecting this part or another part of the glass ceramic at a temperature $T_3$ a second irradiating and simultaneously a second heat treatment, wherein $T_1<T_2$ and $T_3<T_2$ and preferably $T_1<T_3<T_2$.

Preferably, $T_1$ is less than 300° C., in particular not more than 200° C., particularly preferably not more than 150° C. It is moreover preferred that $T_2$ is greater than 700° C., in particular at least 800° C., particularly preferably at least 850° C. $T_3$ is preferably greater than 150° C., in particular greater than 200° C., particularly preferably at least 300° C. In addition, $T_3$ is preferably less than 850° C., in particular less than 800° C., particularly preferably not more than 700° C. Preferably, $T_3$ is in the range of 200 to 800° C. and is particularly preferably 300 to 700° C.

In this embodiment, the first irradiating and the first heat treatment can in particular effect a red colouring of the glass ceramic. By means of the subsequent second irradiating together with the simultaneous second heat treatment in particular a yellow colouring can be effected. The first and the second irradiating can be performed on the same part and/or on different parts of the glass ceramic. In this way it is possible to prepare in particular glass ceramics which have a red colouring as well as a yellow colouring, with the colourings being able to be in each case individually effected at selected locations. It can be advantageous for an efficient process that after the first heat treatment at a temperature $T_2$ the glass ceramic is cooled to the temperature $T_3$ and directly thereafter the second irradiating and the second heat treatment is conducted.

A glass suitable for the process according to the invention and a suitable glass ceramic are usually produced from a corresponding mixture of suitable starting materials, such as carbonates, oxides, phosphates and halides.

It is preferred to use Ce oxides, Ce carbonates, Ce halides, Ce sulfates and/or Ce phosphates as Ce-containing raw materials. In a particularly preferred embodiment, $CeO_2$, $CeCl_3$, $CeF_3$, $CeI_3$, $CeBr_3$, $Ce_2(SO_4)_3$ or a combination thereof is used as Ce-containing raw material.

It is preferred that the glass and the glass ceramic comprise $P_2O_5$, in particular in an amount of 0.5 to 11.0 wt.-%, particularly preferably 0.9 to 10 wt.-%, particularly preferably 0.9 to 8.0 wt.-%, further preferred 2.0 to 8.0 wt.-%, even more preferred 2.0 to 6.0 wt.-%. With a nucleating agent, such as $P_2O_5$, the crystallization during which the glass is converted to a glass ceramic usually proceeds via the mechanism of volume crystallization. Nucleating agent present in the glass is therefore preferably homogeneously distributed therein. Further possible nucleating agents are $TiO_2$, $ZrO_2$, $Nb_2O_5$, metals, e.g. Pt, Pd, Ag and Au, or mixtures thereof.

It is also preferred that the glass and the glass ceramic comprise 0 to 14.0, in particular 1.0 to 14.0, preferably 2.0 to 12.0, particularly preferably 2.0 to 10.0 wt.-% $Al_2O_3$.

It is preferred that the glass and the glass ceramic comprise at least one and preferably all of the following components in the amounts specified:

| Component | wt.-% |
| --- | --- |
| $SiO_2$ | 61.0-88.0 |
| $Li_2O$ | 5.0-24.0 |
| $Al_2O_3$ | 0-14.0 |
| $P_2O_5$ | 0.5-11.0 |
| Ce, calculated as $CeO_2$ | 0.01-1.5 |
| Ag, calculated as $Ag_2O$ | 0.0005-1.3 |
| Au, calculated as $Au_2O$ | 0.0001-0.65 |

The glass and the glass ceramic particularly preferably comprise at least one and preferably all of the following components in the amounts specified:

| Component | wt.-% |
| --- | --- |
| $SiO_2$ | 66.0-81.0 |
| $Li_2O$ | 6.0-22.0 |
| $Al_2O_3$ | 1.0-12.0 |
| $P_2O_5$ | 0.9-8.0 |
| Ce, calculated as $CeO_2$ | 0.03-1.0 |
| Ag, calculated as $Ag_2O$ | 0.002-0.7 |
| Au, calculated as $Au_2O$ | 0.0003-0.25 |

In an embodiment, the glass and the glass ceramic comprise, in addition to $Li_2O$, further alkali metal oxide $Me^I_2O$ in an amount of 0 to 13.0, preferably 0 to 12.0 and particularly preferably 1.0 to 11.0 wt.-%, wherein $Me^I_2O$ is selected from $K_2O$, $Na_2O$, $Rb_2O$ and/or $Cs_2O$.

In a preferred embodiment, the glass and the glass ceramic comprise 1.0 to 12.0, in particular 1.0 to 10.0, particularly preferably 2.0 to 8.0 wt.-% $K_2O$.

Furthermore, it is preferred that the glass and the glass ceramic comprise 0 to 6.0 and preferably 0 to 5.0 wt.-% further oxide of divalent elements $Me^{II}O$, wherein $Me^{II}O$ is selected from MgO, CaO, SrO and/or ZnO.

It is further preferred that the glass and the glass ceramic comprise 0 to 2.0 and preferably 0 to 1.0 wt.-% further oxide of trivalent elements $Me^{III}_2O_3$, wherein $Me^{III}_2O_3$ is selected from $B_2O_3$, $Y_2O_3$, $La_2O_3$ and/or $Er_2O_3$.

Furthermore, it is preferred that the glass and glass ceramic comprise 0 to 2.0 wt.-% and preferably 0 to 1.0 wt.-% further oxide of tetravalent elements $Me^{IV}O_2$, wherein $Me^{IV}O_2$ is selected from $SnO_2$, $ZrO_2$ and/or $GeO_2$.

Moreover, it is preferred that the glass and the glass ceramic comprise 0 to 2.0 wt.-% and preferably 0 to 1.0 wt.-% further oxide of pentavalent elements $Me^V_2O_5$, wherein $Me^V_2O_5$ is selected from $V_2O_5$, $Ta_2O_5$ and/or $Nb_2O_5$.

It is also preferred that the glass and the glass ceramic comprise 0 to 7.5 and preferably 0 to 6.5 wt.-% oxide of hexavalent elements $Me^{VI}O_3$, wherein $Me^{VI}O_3$ is selected from $MoO_3$ and/or $WO_3$.

Some of the above mentioned components can act as coloring agents and/or fluorescent agents. The glass and the glass ceramic can also comprise additional coloring agents and fluorescent agents, such as colouring metal oxides and/or isochromatic pigments customary in the trade.

Typically, to produce the glass, a corresponding mixture of suitable starting materials is melted at temperatures of in particular 1000 to 1800° C., preferably at about 1400 to 1650° C., for a duration of from 0.5 to 10 h and then cooled.

In order to achieve a high homogeneity, the glass melt obtained can be poured into water in order to form a granular glass material. The granular material can then be melted again. The melt can be poured into moulds in order to produce blanks of the glass, so-called solid glass blanks or monolithic blanks.

The cooling can be carried out in a controlled manner in order to make it possible to relieve the stresses in the glass and to prevent strains in the structure which are associated with rapid temperature changes. For this, the melt is usually poured into pre-heated moulds, e.g. at a temperature of 400° C., or slowly cooled in a furnace.

In a preferred embodiment, the colour change is effected in a glass which is a monolithic glass blank or in a glass ceramic which is prepared from a monolithic glass blank.

Glasses used in the process according to the invention can comprise nuclei for forming crystal phases, which is also called "nuclei-containing glass", and are usually precursors for the corresponding glass ceramics. For example, lithium silicate glasses can comprise nuclei for forming lithium metasilicate crystals and/or lithium disilicate crystals.

A glass ceramic used according to the invention can be prepared by means of heat treatments from a produced glass.

The preparation of glass ceramics typically comprises several heat treatments for the nucleation and crystallization.

Usually, e.g. through a first heat treatment, a formation of crystal nuclei which are suitable for forming lithium metasilicate crystals is effected for the preparation of a lithium silicate glass ceramic. Usually, a second heat treatment is effected for the crystallization of lithium metasilicate and a third heat treatment is effected for the conversion of lithium metasilicate to lithium disilicate. It is possible to bring about several steps, such as nucleation and crystallization of lithium metasilicate, during only one heat treatment. Various suitable conditions, i.e. in particular suitable temperature ranges, heating rates and treatment durations, are known in the state of the art, for example from DE 103 36 913 A1, for the preparation of lithium silicate glass ceramics.

In a preferred embodiment, the glass and glass ceramic in which the colour changes effected are consisting only of one glass and one glass ceramic, respectively. This means that there is in particular no mixture of different glasses or glass ceramics. Such a mixture would for example result when preparing a dental restoration from a powder compact which is shaped from more than one glass powder or glass ceramic powder.

It is also preferred that the glass and the glass ceramic in which a colour change is effected in step b) are selected from the group consisting of lithium silicate glass, lithium aluminosilicate glass, lithium silicate glass ceramic, lithium aluminosilicate glass ceramic and quartz glass ceramic.

The crystal phases present in the glass ceramic can be determined by X-ray diffraction analysis (XRD). The masses of the crystal phases can in particular be determined using the Rietveld method. A process suitable for this is described e.g. in M. Dittmer's doctoral thesis "Gläser and Glaskeramiken im System MgO—$Al_2O_3$—$SiO_2$ mit $ZrO_2$ als Keimbildner" [Glasses and glass ceramics in the MgO—$Al_2O_3$—$SiO_2$ system with $ZrO_2$ as nucleating agent], University of Jena 2011.

In a preferred embodiment of the process according to the invention, the glass ceramic to be irradiated in step b) comprises lithium metasilicate, lithium disilicate, low quartz or lithium aluminosilicate, preferably lithium disilicate or low quartz, as main crystal phase.

The term "main crystal phase" denotes the crystal phase which has the highest proportion by mass of all the crystal phases present in the glass ceramic.

In a preferred embodiment, the glass ceramic comprises more than 5 wt.-%, preferably more than 10 wt.-% and particularly preferably more than 20 wt.-% lithium metasilicate, based on the total glass ceramic.

In a further preferred embodiment, the glass ceramic comprises more than 10 wt.-%, preferably more than 30 wt.-% and particularly preferably more than 50 wt.-% lithium disilicate, based on the total glass ceramic.

In a further preferred embodiment, the ceramic comprises lithium disilicate as main crystal phase and low quartz as further crystal phase or low quartz as main crystal phase and lithium disilicate as further crystal phase.

In a preferred embodiment of the process according to the invention, the glass ceramic to be irradiated in step b) comprises, in addition to lithium metasilicate and/or lithium disilicate, one or more further crystal phases selected from lithium aluminosilicate, lithium orthophosphate, apatite, low quartz, cristobalite, diopside, wollastonite, scheelite and powellite, particularly preferably low quartz and/or lithium aluminosilicate.

In step a) of the process according to the invention the glass and the glass ceramic are given the shape of a desired dental restoration. It is particularly preferred that the glass and the glass ceramic are given the shape of the dental restoration in step a) by pressing or machining.

The shaping can comprise pressing the glass and the glass ceramic, for example in the form of a partially presintered lithium silicate blank, at increased temperature and increased pressure to give a desired shape. During the pressing the material used is converted to a viscous state, with the result that it can flow into the desired shape under the influence of the increased pressure.

In a preferred embodiment, the shaping in step a) is effected by machining. The machining is typically effected by material-removal processes, such as by milling and grinding. Glass ceramics, in particular lithium silicate glass ceramics, which comprise lithium metasilicate or lithium disilicate, particularly preferably lithium metasilicate, as main crystal phase are preferably used for the machining. The use of lithium silicate glass ceramic not predominantly crystallized to form lithium disilicate offers the advantage that a simpler machining with less material wear is possible. After the machining of such a partially crystallized material, the latter is typically subjected to a heat treatment to effect further crystallization, preferably to form lithium disilicate.

It is preferred that the machining is effected in a CAD/CAM process. Glass ceramics, such as lithium silicate glass ceramics, in particular in the form of blanks, can be used. The shape of these blanks can be matched to the type of machine used for the machining.

In a further preferred embodiment of the process, the colour change step is combined with a CAD/CAM process. The process according to the invention thus includes processes in which information about the colour design of the set of teeth is additionally recorded and processed in the CAD step. On the basis of a 3D model, which also takes into account the processed colour information, a dental restoration can be modelled which not only has the desired shape, but also has the desired colour design. A dental restoration can be manufactured on the basis of this model in the CAM step. The glass and the glass ceramic, preferably in the form of a blank, are typically shaped by machining and irradiated according to step b) and subjected to a heat treatment. The irradiation is preferably effected in regions which already have the shape of the desired dental restoration. However, it can also be desirable to carry out the machining for the shaping after the colour change according to step b) has been effected.

Dental restorations with individual shape and individual colouring can thus be produced in an automated process. Such a CAD/CAM process with colouring is very attractive, as it makes it possible to supply the patient with the desired dental restoration quickly. Precisely as in the case of conventional CAD/CAM processes, a so-called chairside treatment (treatment at the dental chair) is possible for the dentist.

In a particularly preferred embodiment of the process according to the invention, the dental restoration is a bridge, an inlay, an onlay, a veneer, an abutment, a partial crown, a crown or a shell.

Steps a) and b) of the process according to the invention can be carried out in any desired sequence. The process can furthermore comprise several shaping steps and/or several colour change steps.

In an embodiment, the glass and the glass ceramic are given the shape of the desired dental restoration before or after the irradiation or before or after the heat treatment.

In a further embodiment, the glass and the glass ceramic are given the shape of the desired dental restoration between the measures of irradiating and heat treatment required for the colour change.

The invention furthermore relates to a multi-coloured dental restoration which is obtainable by the process according to the invention described above.

The multi-coloured dental restorations prepared by the process according to the invention are typically characterized in that they have substantially continuous colour gradients, i.e. colour gradients with a spatial resolution in the micrometer or nanometer range. Multi-coloured dental restorations which have been prepared by a process usual according to the prior art, on the other hand, normally have differently coloured colour layers with layer thicknesses in the millimeter range.

The multi-coloured dental restoration prepared in the process according to the invention as a rule has advantageous mechanical properties. A high lithium disilicate content in the dental restoration prepared is usually desirable because of the superior mechanical properties, such as for example the high strength.

In a preferred embodiment, the dental restoration prepared by the process according to the invention has a biaxial strength of at least 200 MPa, in particular at least 250 MPa, particularly preferably at least 300 MPa and/or a fracture toughness of at least 1.5 MPa m$^{0.5}$.

In a preferred embodiment, the glass and the glass ceramic of the dental restoration, in which glass and glass ceramic the colour change has been effected, consist of only one glass and only one glass ceramic, respectively. This means that in the dental restoration there is in particular no mixture of different glasses or glass ceramics present.

The dental restoration prepared by the process according to the invention preferably has a high chemical resistance with an acid solubility according to ISO 6872 of below 100 μg/cm$^2$, in particular below 50 μg/cm$^2$.

The invention also relates to the use of a glass or a glass ceramic as dental material, in particular for the preparation of a multi-coloured dental restoration, wherein a colour change is effected in at least one part of the glass or the glass ceramic by irradiating this part with artificial electromagnetic radiation and subjecting this irradiated part to a heat treatment.

In particular, the invention also relates to the use of a glass or a glass ceramic as dental material, in which the glass and the glass ceramic are subjected to a process as described above. All glasses and glass ceramics which have been described in relation to the process according to the invention are also suitable for the use according to the invention of a glass or a glass ceramic. All process steps and process parameters which have been described in relation to the process according to the invention can likewise also be carried out and chosen in the use according to the invention.

The invention is explained in more detail in the following with reference to examples.

EXAMPLES

Glasses with the chemical compositions specified in Tables 1 to 5A were prepared. For this, a corresponding batch of raw materials, such as oxides, carbonates, phosphates and halides, was melted at a melting temperature ($T_s$) of from 1000 to 1650° C. for a melting duration ($t_s$) of from 60 to 300 min. Optionally, the preparation of the glass melt was effected in a two-step process with two melting temperatures ($T_{s1}$, $T_{s2}$) and two melting durations ($t_{s1}$, $t_{s2}$).

The components of the glasses and glass ceramics, unless otherwise indicated, are calculated as oxides, as is usual with glasses and glass ceramics.

Multi-coloured dental restorations were prepared from the glasses by means of the process according to the invention, wherein the conditions specified in Tables 6 to 16 were used for the irradiation and heat treatment. In Tables 6 to 16 the following meanings apply $T_g$ glass transition temperature,
$T_s$ melting temperature,
$t_s$ melting duration,
$T_N$ nucleation temperature,
$t_N$ nucleation duration,
QT mercury vapour lamp, type TQ 150 high-pressure Hg lamp from Heraeus, Hanau, Germany,
LED LED light source, type LCS-0310-03-23 from Mightex Systems, Ontario, Canada, or type M300L4 from ThorLabs Inc., NJ, USA,
$\sigma_B$ biaxial strength, determined according to ISO 6872 (2008).

The process steps given in Tables 6 to 16 are listed according to their temporal sequence, wherein process steps listed at the top in the respective table are effected earlier than process steps listed further down.

A Programat-type furnace from Ivoclar Vivadent AG was used for all heat treatments indicated in the examples.

Crystal phases of glass ceramics were determined by means of X-ray diffraction analyses.

The colour values (L*a*b) of glass ceramics produced were determined in the measurement range of 400-700 nm by means of a CM-3700d spectrophotometer (Konica-Minolta). The CR value (translucency) was determined according to British Standard BS 5612.

TABLE 1

| | Example | | | | | | | | | | | |
|---|---|---|---|---|---|---|---|---|---|---|---|---|
| Composition | 1-5 wt.-% | 6-8 wt.-% | 9 wt.-% | 10 wt.-% | 11 wt.-% | 12-13 wt.-% | 14-16 wt.-% | 17 wt.-% | 18 wt.-% | 19 wt.-% | 20 wt.-% | 21 wt.-% |
| SiO$_2$ | 70.21 | 70.11 | 73.91 | 71.48 | 72.44 | 73.70 | 73.73 | 70.62 | 70.6 | 70.51 | 71.44 | 68.11 |
| Li$_2$O | 10.97 | 10.96 | 12.68 | 14.22 | 14.41 | 15.29 | 15.31 | 11.04 | 11.04 | 11.02 | 11.17 | 19.92 |
| Na$_2$O | 2.58 | 2.58 | 2.25 | 2.25 | 2.00 | | | 2.60 | 2.60 | 2.59 | 2.63 | |
| K$_2$O | 3.93 | 3.92 | 3.42 | 3.42 | 3.42 | 3.99 | 3.99 | 3.94 | 3.94 | 3.94 | 4.00 | 4.13 |
| Al$_2$O$_3$ | 6.80 | 6.79 | 3.70 | 4.60 | 3.70 | 3.51 | 3.51 | 6.83 | 6.83 | 6.82 | 6.92 | 3.64 |
| SnO* | 0.07 | 0.07 | 0.07 | 0.07 | 0.07 | | | | | | 0.07 | 0.08 |
| CeO$_2$ | 0.03 | 0.03 | 0.03 | 0.03 | 0.03 | 0.03 | 0.03 | 0.03 | 0.03 | 0.09 | 0.03 | 0.03 |
| Sb$_2$O$_3$ | 0.40 | 0.40 | 0.40 | 0.40 | 0.40 | | | | | | 0.41 | 0.44 |

TABLE 1-continued

| Composition | 1-5 wt.-% | 6-8 wt.-% | 9 wt.-% | 10 wt.-% | 11 wt.-% | 12-13 wt.-% | 14-16 wt.-% | 17 wt.-% | 18 wt.-% | 19 wt.-% | 20 wt.-% | 21 wt.-% |
|---|---|---|---|---|---|---|---|---|---|---|---|---|
| $Ag_2O$ | 0.12 | 0.25 | 0.12 | 0.12 | 0.12 | | | | | 0.12 | 0.12 | 0.13 |
| AgCl* | | | | | | 0.09 | 0.03 | 0.03 | 0.05 | | | |
| $P_2O_5$ | 4.89 | 4.89 | 3.42 | 3.42 | 3.42 | 3.39 | 3.40 | 4.91 | 4.91 | 4.91 | 3.21 | 3.52 |

*used as raw material

TABLE 2

| Example | 22 wt.-% | 23-25 wt.-% | 26 wt.-% | 27 wt.-% | 28 wt.-% | 29 wt.-% | 30 wt.-% | 31 wt.-% | 32 wt.-% | 33 wt.-% | 34-38 wt.-% | 39 wt.-% | 40-53 wt.-% |
|---|---|---|---|---|---|---|---|---|---|---|---|---|---|
| Composition | | | | | | | | | | | | | |
| $SiO_2$ | 73.67 | 75.17 | 72.78 | 74.55 | 73.11 | 72.89 | 72.89 | 73.68 | 73.71 | 73.716 | 73.713 | 72.771 | 73.527 |
| $Li_2O$ | 13.09 | 13.35 | 13.92 | 12.36 | 14.54 | 14.50 | 14.50 | 15.30 | 15.31 | 15.31 | 15.31 | 15.11 | 15.27 |
| $Na_2O$ | 2.23 | 2.25 | 2.24 | 2.21 | 1.75 | 2.00 | 2.00 | 3.99 | 3.99 | 3.99 | 3.99 | 3.94 | 3.98 |
| $K_2O$ | | | | | 3.42 | 3.42 | 3.42 | | | | | | |
| $Al_2O_3$ | 7.33 | 5.55 | 7.38 | 7.28 | 3.70 | 3.70 | 3.70 | 3.51 | 3.51 | 3.51 | 3.51 | 3.46 | 3.50 |
| SnO* | 0.07 | 0.07 | 0.07 | 0.07 | | | | | 0.03 | 0.025 | 0.025 | 0.025 | 0.025 |
| $CeO_2$ | 0.03 | 0.03 | 0.03 | 0.03 | 0.031 | 0.031 | 0.031 | 0.06 | 0.03 | 0.032 | 0.032 | 0.031 | 0.032 |
| $Sb_2O_3$ | 0.40 | 0.40 | 0.40 | 0.40 | | | | | | | | | |
| $Au_2O$ | | | | | | | | | 0.07 | 0.02 | 0.004 | 0.007 | 0.0004 | 0.006 |
| $Ag_2O$ | 0.12 | 0.12 | 0.10 | 0.06 | | | | | | | | | |
| AgCl* | | | | | 0.026 | | | | | 0.013 | 0.013 | 0.003 | 0.0105 |
| AgBr* | | | | | | 0.034 | | | | | | | |
| AgI* | | | | | | | 0.043 | | | | | | |
| $P_2O_5$ | 3.06 | 3.06 | 3.08 | 3.04 | 3.42 | 3.42 | 3.42 | 3.39 | 3.40 | 3.40 | 3.40 | 4.66 | 3.65 |

*used as raw material

TABLE 3

| Example | 54 wt.-% | 55 wt.-% | 56 wt.-% | 57 wt.-% | 58 wt.-% | 59 wt.-% | 60 wt.-% | 61 wt.-% | 62 wt.-% | 63 wt.-% | 64 wt.-% | 65 wt.-% | 66 wt.-% | 67 wt.-% |
|---|---|---|---|---|---|---|---|---|---|---|---|---|---|---|
| Composition | | | | | | | | | | | | | | |
| $SiO_2$ | 75.59 | 70.24 | 69.23 | 72.68 | 71.79 | 73.13 | 73.37 | 72.90 | 70.08 | 70.04 | 70.03 | 70.06 | 73.65 | 73.49 |
| $Li_2O$ | 15.69 | 14.58 | 14.38 | 15.09 | 14.91 | 15.19 | 15.23 | 15.14 | 14.55 | 14.54 | 14.54 | 14.55 | 15.30 | 15.25 |
| $K_2O$ | 4.08 | 3.80 | 3.75 | 3.93 | 3.89 | 3.96 | 3.97 | 3.95 | 3.79 | 3.79 | 3.78 | 3.79 | 3.99 | 3.98 |
| MgO | | | | | | | | | | | | 4.98 | | |
| CaO | | | | | | | | | 4.95 | | | | | |
| SrO | | | | | | | | | | 5.03 | | | | |
| ZnO | | | | | | | | | | | 5.01 | | | |
| $Al_2O_3$ | 3.60 | 3.33 | 3.29 | 3.46 | 3.42 | 3.37 | 3.50 | 3.47 | 3.34 | 3.33 | 3.34 | 3.34 | 3.51 | 3.50 |
| $ZrO_2$ | | | | | | | | 1.13 | | | | | | |
| SnO* | | | | | | | | | | | | | 0.03 | |
| $CeO_2$ | 0.03 | 0.03 | 0.03 | 1.00 | 0.03 | 0.03 | 0.03 | 0.03 | 0.03 | 0.03 | 0.03 | 0.03 | 0.06 | |
| $CeF_3$ | | | | | | | | | | | | | | 0.36 |
| AgCl* | 0.03 | 0.03 | 0.03 | 0.50 | 0.03 | 0.03 | 0.03 | 0.03 | 0.03 | 0.03 | 0.03 | 0.03 | 0.03 | 0.03 |
| CuCl* | | | | | | | | | | | | | 0.04 | |
| $Ta_2O_5$ | | | | | | 0.81 | | | | | | | | |
| $Nb_2O_5$ | | | | | | | 0.49 | | | | | | | |
| $MoO_3$ | | | | | 2.61 | | | | | | | | | |
| $WO_3$ | | | 6.10 | | | | | | | | | | | |
| $P_2O_5$ | 0.98 | 7.99 | 3.19 | 3.34 | 3.32 | 3.48 | 3.38 | 3.35 | 3.23 | 3.21 | 3.24 | 3.22 | 3.39 | 3.39 |

*used as raw material

TABLE 4

| Example | 68 wt.-% | 69 wt.-% | 70 wt.-% | 71 wt.-% | 72 wt.-% | 73 wt.-% | 74-75 wt.-% | 76 wt.-% | 77 wt.-% | 78-79 wt.-% |
|---|---|---|---|---|---|---|---|---|---|---|
| Composition | | | | | | | | | | |
| $SiO_2$ | 70.79 | 76.72 | 68.86 | 73.39 | 68.63 | 79.96 | 71.29 | 73.03 | 72.79 | 72.10 |
| $Li_2O$ | 7.63 | 8.27 | 14.39 | 15.18 | 15.71 | 15.29 | 12.40 | 10.38 | 10.34 | 15.02 |
| $Na_2O$ | | | | | | 0.94 | | | | |
| $K_2O$ | 9.57 | 3.61 | 9.99 | 3.96 | 3.93 | 1.07 | 3.40 | 3.64 | 3.63 | 3.95 |
| MgO | 1.71 | 1.85 | | | | | 1.60 | 1.86 | 1.85 | |
| CaO | 3.10 | 3.36 | | | | | 2.32 | 3.38 | 3.37 | |
| $Al_2O_3$ | 3.57 | 3.86 | 3.40 | 3.35 | 3.33 | | 4.02 | 3.89 | 3.87 | 3.34 |
| $Er_2O_3$ | | | | 0.70 | | | | | 0.34 | |
| $SnO_2$ | 0.03 | 0.03 | | | | | 0.07 | 0.03 | 0.03 | |
| $GeO_2$ | | | | | 4.74 | | | | | 1.91 |
| $CeO_2$ | 0.23 | 0.24 | 0.03 | 0.03 | 0.03 | 0.03 | 0.03 | 0.12 | 0.12 | 0.03 |

TABLE 4-continued

| Example | 68 | 69 | 70 | 71 | 72 | 73 | 74-75 | 76 | 77 | 78-79 |
|---|---|---|---|---|---|---|---|---|---|---|
| $Sb_2O_3$ | | | | | | | 0.42 | | | |
| $Ag_2O$ | | | | | | | 0.12 | | | |
| AgCl* | 0.05 | 0.05 | 0.03 | 0.03 | 0.03 | 0.03 | | 0.05 | 0.05 | 0.03 |
| $P_2O_5$ | 3.32 | 2.01 | 3.30 | 3.36 | 3.60 | 2.68 | 4.33 | 3.62 | 3.61 | 3.62 |

*used as raw material

TABLE 5

| Example | 80 | 81 | 82 | 83 | 84 | 85 | 86 | 87 | 88 | 89 | 90 |
|---|---|---|---|---|---|---|---|---|---|---|---|
| Composition | wt.-% | wt.-% | wt.-% | wt.-% | wt.-% | wt.-% | wt.-% | wt.-% | wt.-% | wt.-% | wt.-% |
| $SiO_2$ | 73.85 | 75.59 | 75.50 | 76.33 | 77.47 | 76.89 | 73.08 | 78.50 | 69.11 | 78.08 | 74.65 |
| $Li_2O$ | 7.96 | 8.15 | 8.14 | 8.23 | 6.42 | 8.29 | 7.88 | 8.46 | 7.45 | 8.42 | 8.05 |
| $K_2O$ | 5.67 | 3.57 | 3.56 | 3.60 | 3.51 | 3.63 | 3.45 | 3.71 | 3.26 | 3.69 | 3.53 |
| MgO | 1.78 | 1.82 | 1.82 | 1.84 | 1.79 | | 4.96 | 1.90 | 1.66 | 1.88 | 1.80 |
| CaO | 3.23 | 3.31 | 3.31 | 3.35 | 3.26 | 3.37 | 3.21 | 3.43 | 3.03 | | 4.38 |
| $Al_2O_3$ | 3.72 | 3.81 | 3.80 | 3.85 | 3.74 | 3.88 | 3.68 | | 11.93 | 3.94 | 3.77 |
| $SnO_2$ | 0.03 | 0.03 | 0.03 | 0.03 | 0.03 | 0.03 | 0.03 | 0.03 | 0.03 | 0.03 | 0.03 |
| $CeO_2$ | 0.24 | 0.12 | 0.24 | 0.24 | 0.24 | 0.24 | 0.24 | 0.24 | 0.23 | 0.24 | 0.24 |
| AgCl* | 0.05 | 0.05 | 0.05 | 0.05 | 0.05 | 0.05 | 0.05 | 0.05 | 0.05 | 0.05 | 0.05 |
| $P_2O_5$ | 3.47 | 3.55 | 3.55 | 2.48 | 3.49 | 3.62 | 3.42 | 3.68 | 3.25 | 3.67 | 3.50 |

*used as raw material

TABLE 5A

| Example | 92 | 93 | 94 | 95 | 96 | 97 | 98 | 99 | 100 | 101 |
|---|---|---|---|---|---|---|---|---|---|---|
| Composition | as Exp. 23 | as Exp. 28 | as Exp. 29 | as Exp. 30 | Wt.-% | as Exp. 27 | as Exp. 40 | Wt.-% | Wt.-% | Wt.-% |
| $SiO_2$ | | | | | 71.76 | | | 73.84 | 72.93 | 72.00 |
| $Li_2O$ | | | | | 14.87 | | | 14.69 | 10.36 | 7.76 |
| $Na_2O$ | | | | | 2.26 | | | 2.00 | | |
| $K_2O$ | | | | | | | | 2.00 | 3.64 | 8.02 |
| MgO | | | | | | | | | 1.86 | 1.73 |
| CaO | | | | | | | | | 3.38 | 3.15 |
| $Al_2O_3$ | | | | | 7.45 | | | 4.00 | 3.89 | 3.63 |
| $SnO_2$ | | | | | | | | | 0.03 | 0.03 |
| SnO | | | | | 0.07 | | | | | |
| $CeO_2$ | | | | | 0.03 | | | 0.08 | 0.24 | 0.24 |
| $Sb_2O_3$ | | | | | 0.40 | | | | | |
| $Au_2O$ | | | | | | | | | | |
| AgCl* | | | | | | | | 0.02 | 0.05 | 0.05 |
| AgBr* | | | | | | | | 0.03 | | |
| AgI* | | | | | | | | 0.04 | | |
| $Ag_2O$ | | | | | 0.08 | | | | | |
| $P_2O_5$ | | | | | 3.08 | | | 3.30 | 3.62 | 3.39 |

| Example | 102 | 103 | 104 | 105 | 106 | 107 | 108 | 109 | 110 |
|---|---|---|---|---|---|---|---|---|---|
| Composition | as Exp. 80 | Wt.-% | Wt.-% | Wt.-% | as Exp. 31 | as Exp. 32 | Wt.-% | as Exp. 34 | Wt.-% |
| $SiO_2$ | | 75.50 | 74.36 | 76.15 | | | 73.70 | | 68.54 |
| $Li_2O$ | | 8.14 | 8.01 | 7.58 | | | 15.31 | | 20.05 |
| $Na_2O$ | | | | | | | | | |
| $K_2O$ | | 3.56 | 3.51 | 3.54 | | | 3.99 | | 4.15 |
| MgO | | 1.82 | 1.79 | 1.81 | | | | | |
| CaO | | 3.31 | 3.26 | 3.29 | | | | | |
| $Al_2O_3$ | | 3.80 | 3.75 | 3.78 | | | 3.51 | | 3.65 |
| $SnO_2$ | | 0.03 | 0.03 | 0.03 | | | | | |
| SnO | | | | | | | 0.03 | | |
| $CeO_2$ | | 0.24 | 0.24 | 0.24 | | | 0.03 | | 0.03 |
| $Sb_2O_3$ | | | | | | | | | |
| $Au_2O$ | | | | | | | 0.02 | | 0.04 |
| AgCl* | | 0.05 | 0.05 | 0.05 | | | 0.01 | | |
| AgBr* | | | | | | | | | |
| AgI* | | | | | | | | | |
| $Ag_2O$ | | | | | | | | | |
| $P_2O_5$ | | 3.55 | 5.00 | 3.53 | | | 3.40 | | 3.54 |

*used as raw material

Examples 1 to 8: Colour Change by Irradiation of a Glass with a Mercury Vapour Lamp and Heat Treatment A heat treatment for the formation of crystal nuclei was first carried out on the lithium silicate glasses of Examples 1 to 5. Then, the nuclei-containing glasses were subjected to an irradiation with a mercury vapour lamp (type TQ 150 high-pressure Hg lamp, Heraeus, Hanau, Germany) for 15 to 60 min and to a heat treatment at 470 to 610° C. for 15 to 60 min. The conditions used in each case, the colours effected by the irradiation and heat treatment and the determined crystal phases of the glass ceramic produced are specified in Table 6. A nucleation duration of 0 min means that the glasses were transferred into a furnace set to the nucleation temperature after pouring, and cooled there without holding time.

present in the glass ceramics of Examples 6 to 8. From the colours which were produced in the glass ceramics of Examples 2 and 6, it becomes clear that a more intense colour can be effected if the glass or the glass ceramic contains a larger amount of Ag.

The colour changes were effected on the glass and the glass ceramic of Example 7 in two steps, which comprised in each case one irradiation and one heat treatment. The first colour change comprised an irradiation of nuclei-containing glass with a mercury vapour lamp and a heat treatment. The heat treatment of the first colour change also brought about a crystallization of the nuclei-containing glass. The glass ceramic formed in the process was irradiated again with an LED light source (LCS-0310-03-23 from Mightex Systems, ON, Canada) and subjected to a further heat treatment for the colour change and further crystallization.

TABLE 6

| Example | 1 | 2 | 3 | 4 | 5 | 6 | 7 | 8 |
|---|---|---|---|---|---|---|---|---|
| $T_g$/° C. | | | | | | | | |
| $T_S$/° C. | 1500 | 1500 | 1500 | 1500 | 1500 | 1500 | 1500 | 1500 |
| $t_S$/min | 120 | 120 | 120 | 120 | 120 | 120 | 120 | 120 |
| $T_N$/° C. | 530 | 530 | 530 | 530 | 530 | 530 | 530 | 530 |
| $t_N$/min | 0 | 0 | 0 | 0 | 0 | 0 | 0 | 0 |
| Irradiation of glass | | | | | | | | |
| Radiation source Wavelength/nm | QT | QT | QT | QT | QT | QT | QT | QT |
| Duration/min Intensity (%) | 15 | 60 | 15 | 15 | 15 | 60 | 15 | 45 |
| 1$^{st}$ heat treatment | | | | | | | | |
| Temperature/° C. | 550 | 550 | 550 | 610 | 470 | 550 | 550 | 550 |
| Duration/min | 60 | 60 | 15 | 15 | 15 | 60 | 15 | 60 |
| Irradiation of glass ceramic | | | | | | | | |
| Radiation source | | | | | | | LED | |
| Wavelength (nm) | | | | | | | 310 | |
| Duration (min) | | | | | | | 15 | |
| Intensity (%) | | | | | | | 100 | |
| 2$^{nd}$ heat treatment | | | | | | | | |
| Temperature (° C.) | | | | | | | 600 | |
| Duration (min) | | | | | | | 10 | |
| Crystal phases | $Li_2SiO_3$ $Li_3PO_4$ | $Li_2SiO_3$ $Li_3PO_4$ | $Li_2SiO_3$ $Li_3PO_4$ | $Li_2SiO_3$ $Li_3PO_4$ | $Li_2SiO_3$ $Li_3PO_4$ | $Li_2SiO_3$ $Li_3PO_4$ | $Li_2SiO_3$ $Li_3PO_4$ | $Li_2SiO_3$ $Li_3PO_4$ |
| Colour impression of the glass ceramic | yellow-red | orange-red | yellow | orange | green-grey | red-black | orange-pink | dark red-brown |

After irradiation of the nuclei-containing glasses and subsequent heat treatment, yellow and red colourings were found in the glass ceramics. It was furthermore observed, e.g. in the glass ceramics of Examples 1 and 2, that a longer irradiation effected a more intense and darker colouring.

It can also be recognized from the comparison of Examples 3 to 5 that the colour effected by the colour change was dependent on the temperature of the heat treatment. The heat treatment of Example 4, which was effected at a high temperature compared with Examples 3 and 5, resulted in a more intense and darker colouring of the glass ceramic than in the glass ceramics of Examples 3 and 5.

A reduced translucency was observed in the glass ceramic of Example 4 after irradiation and heat treatment.

It is apparent from the comparison of the colour of the irradiated and heat-treated regions of the glass ceramics of Examples 6 and 8 that a more intense and darker colour could be effected by a longer irradiation.

The glass ceramics prepared in Examples 1 to 5 included 0.12 wt.-% $Ag_2O$, whereas there was 0.25 wt.-% $Ag_2O$ Examples 9 to 12: Colour Change by Irradiation of a Glass with an LED with a Wavelength of 300 nm and Heat Treatment The lithium silicate glasses of Examples 9 to 12 were irradiated with radiation having a wavelength of 300 nm for 15 minutes by means of an LED (M300L4 from ThorLabs Inc., NJ, USA).

The irradiated glasses were subjected to the heat treatments specified in Table 7. The colours brought about by the colour change in the glass ceramic produced are likewise specified in Table 7. Different colourings were found in Examples 9 to 11 in glass ceramics with $CeO_2$, Ag, $Sb_2O_3$ and SnO. A brown-yellow colouring was observed in Example 12, in which the irradiated glass included Ce, Ag and Cl.

Examples 13 to 18: Colour Change in a Ce-, Ag- and Cl-Containing Glass Ceramic by Irradiation with an LED and Heat Treatment The lithium silicate glasses of Examples 13 to 18 were first subjected to a heat treatment for nucleation and a heat treatment for crystallization. The glass ceramics were irradiated with an LED (LCS-0310-03-23 from Mightex Systems, ON, Canada) for 15 min, wherein the radiation contained a portion with a wavelength of 310 nm. Then, the irradiated glass ceramics were subjected to a further heat treatment. The colours effected by the colour change are likewise specified in Table 7.

A very high biaxial strength advantageous for the use as dental material of 604±104 MPa was determined for the glass ceramic produced in Example 16.

Examples 19 to 21: Colour Change in a Glass Ceramic by Irradiation with an LED or Mercury Vapour Lamp and Heat Treatment The lithium silicate glasses of Examples 19 to 21 were first subjected to a heat treatment for nucleation and a heat treatment for crystallization. The glass ceramics were irradiated with an LED (LCS-0310-03-23 from Mightex Systems, ON, Canada) or mercury vapour lamp for 15 min and subjected to a further heat treatment. The colours effected by the colour change are specified in Table 8.

Examples 22 to 27: Colour Change in a Glass Ceramic which was Crystallized by Means of Two Heat Treatments by Irradiation with an LED and Heat Treatment The lithium silicate glasses of Examples 22 to 27 were first subjected to one heat treatment for nucleation and two heat treatments for crystallization. The glass ceramics were irradiated with an LED (LCS-0310-03-23 from Mightex Systems, ON, Canada) for 15 min and subjected to a further heat treatment.

In the glass ceramics of Examples 23 and 24 a darker colour could be effected by a longer duration of the heat treatment after the irradiation.

In the glass ceramics of Examples 23 and 25 a darker and more intense colour could be effected by a higher temperature of the heat treatment after the irradiation.

TABLE 7

| Example | 9 | 10 | 11 | 12 | 13 | 14 | 15 | 16 | 17 | 18 |
|---|---|---|---|---|---|---|---|---|---|---|
| $T_g$/° C. | 458.2 | 451.7 | 449.9 | | 453.6 | 453.6 | 453.6 | 453.6 | | |
| $T_S$/° C. | | | | 1400 | 1400 | 1400 | 1400 | 1400 | 1400 | 1400 |
| $t_S$/min | | | | 60 | 60 | 60 | 60 | 60 | 60 | 60 |
| $T_N$/° C. | | | | 490 | 490 | 490 | 490 | 490 | 530 | 530 |
| $t_N$/min | | | | 0 | 0 | 10 | 10 | 10 | 0 | 0 |
| Irradiation of glass | | | | | | | | | | |
| Radiation source | LED | LED | LED | LED | | | | | | |
| Wavelength/nm | 300 | 300 | 300 | 300 | | | | | | |
| Duration/min | 15 | 15 | 15 | 15 | | | | | | |
| Intensity/% | 100 | 100 | 100 | 100 | | | | | | |
| $1^{st}$ heat treatment | | | | | | | | | | |
| Temperature/° C. | 550 | 550 | 550 | 550 | 850 | 850 | 850 | 900 | 800 | 600 |
| Duration/min | 15 | 15 | 15 | 15 | 15 | 15 | 15 | 60 | 10 | 10 |
| Irradiation of glass ceramic | | | | | | | | | | |
| Radiation source | | | | | LED | LED | LED | LED | LED | LED |
| Wavelength/nm | | | | | 310 | 310 | 310 | 310 | 310 | 310 |
| Duration/min | | | | | 15 | 15 | 15 | 15 | 15 | 15 |
| Intensity/mA | | | | | 400 | 400 | 400 | 400 | 400 | 400 |
| $2^{nd}$ heat treatment | | | | | | | | | | |
| Temperature/° C. | 650 | 650 | 650 | | 550 | 550 | 650 | 550 | 550 | 550 |
| Duration/min | 20 | 20 | 20 | | 30 | 30 | 30 | 15 | 30 | 30 |
| $3^{rd}$ heat treatment | | | | | | | | | | |
| Temperature/° C. | | | | 800 | | | | | | |
| Duration/min | | | | 10 | | | | | | |
| Crystal phases | $Li_2SiO_3$ $Li_3PO_4$ | $Li_2Si_2O_5$ $Li_2SiO_3$ $Li_3PO_4$ | $Li_2Si_2O_5$ $Li_2SiO_3$ $Li_3PO_4$ | $Li_2Si_2O_5$ $Li_2SiO_3$ $Li_3PO_4$ | $Li_2Si_2O_5$ $Li_2SiO_3$ $Li_3PO_4$ | | | $Li_2Si_2O_5$ $Li_3PO_4$ | $Li_2Si_2O_5$ $Li_2SiO_3$ $Li_3PO_4$ | $Li_2SiO_3$ $Li_3PO_4$ |
| $\sigma_B$ (MPa) | | | | | | | | 604 ± 104 | | |
| CR (translucency) | | | | | | | | 88.3 | | |
| Colour impression of the glass ceramic | light yellow | intense yellow | yellow | brown-yellow | yellow | yellow | yellow-brown | yellow-light brown | yellow, light brown | yellow, light brown |

TABLE 8

| Example | 19 | 20 | 21 | 22 | 23 | 24 | 25 | 26 | 27 |
|---|---|---|---|---|---|---|---|---|---|
| $T_g$/° C | | | 441.8 | | | | | | |
| $T_S$/° C | 1400 | 1500 | 1400 | | | | | | |
| $t_S$/min | 60 | 120 | 60 | | | | | | |
| $T_N$/° C | 530 | 530 | 460 | 480 | 480 | 480 | 480 | 470 | 510 |
| $t_N$/min | 0 | 0 | 10 | 10 | 10 | 10 | 10 | 10 | 10 |
| 1st heat treatment | | | | | | | | | |
| Temperature/° C | 600 | 750 | 600 | 600 | 590 | 590 | 590 | 600 | 600 |
| Duration/min | 10 | 10 | 10 | 20 | 40 | 40 | 40 | 20 | 20 |
| Irradiation of glass ceramic | | | | | | | | | |
| Radiation source | LED | QT | LED | | | | | | |
| Wavelength/nm | 310 | | 310 | | | | | | |
| Duration/min | 15 | 60 | 15 | | | | | | |
| Intensity/mA | 400 | | 400 | | | | | | |
| 2nd heat treatment | | | | | | | | | |
| Temperature/° C | 550 | 550 | 550 | 800 | 780 | 780 | 780 | 800 | 800 |
| Duration/min | 60 | 30 | 30 | 10 | 15 | 15 | 15 | 10 | 10 |
| Irradiation of glass ceramic | | | | | | | | | |
| Radiation source | | | | LED | LED | LED | LED | LED | LED |
| Wavelength/nm | | | | 310 | 310 | 310 | 310 | 310 | 310 |
| Duration/min | | | | 15 | 15 | 15 | 15 | 15 | 15 |
| Intensity/mA | | | | 400 | 400 | 400 | 400 | 400 | 400 |
| 3rd heat treatment | | | | | | | | | |
| Temperature/° C | | | | 650 | 700 | 700 | 580 | | 650 |
| Duration/min | | | | 5 | 15 | 30 | 15 | | 15 |
| Crystal phases | | | $Li_2SiO_3$ $Li_3PO_4$ | $Li_2Si_2O_5$ $Li_{0.155}Al_{0.155}$— $Si_{0.845}O_2$ $Li_3PO_4$ $LiAlSi_2O_6$ | $Li_2Si_2O_5$ cristo- balite $Li_3PO_4$ $LiAlSi_2O_6$ | $Li_2Si_2O_5$ cristo- balite $Li_3PO_4$ $LiAlSi_2O_6$ | $Li_2Si_2O_5$ cristo- balite $Li_3PO_4$ $LiAlSi_2O_6$ | $Li_2Si_2O_5$ $Li_3PO_4$ $Li_xAl_xSi_{3-x}O_6$ (virgilite) $Li_{0.4}Al_{0.4}$— $Si_{0.6}O_2$ | $Li_2Si_2O_5$ $Li_3PO_4$ β-quartz cristo- balite |
| Colour impression of the glass ceramic | yellow- light brown | orange- brown | yellow- light brown | yellow | intense yellow | orange- brown | light yellow | yellow | yellow |

Examples 28 to 30: Colour Change in a Glass Ceramic which Comprises Ag as Well as Cl or Br or I by Irradiation with an LED and Heat Treatment Glasses were produced using AgCl, AgBr or AgI as raw material and subjected to one heat treatment for nucleation and two heat treatments for crystallization. The glass ceramics were irradiated and subjected to another heat treatment.

TABLE 9

| Example | 28 | 29 | 30 |
|---|---|---|---|
| $T_N$/° C | 470 | 460 | 460 |
| $t_N$/min | 10 | 30 | 30 |
| 1st heat treatment | | | |
| Temperature/° C | 630 | 600 | 700 |
| Duration/min | 15 | 30 | 10 |
| 2nd heat treatment | | | |
| Temperature/° C | 880 | 830 | 870 |
| Duration/min | 1 | 5 | 2 |
| Irradiation of glass ceramic | | | |
| Radiation source | LED | LED | LED |
| Wavelength/nm | 310 | 310 | 310 |
| Duration/min | 15 | 15 | 15 |
| Intensity/mA | 400 | 400 | 400 |
| 3rd heat treatment | | | |
| Temperature/° C | 650 | 650 | 550 |
| Duration/min | 15 | 15 | 60 |
| Crystal phases | $Li_2Si_2O_5$ $Li_3PO_4$ | $Li_2Si_2O_5$ $Li_3PO_4$ | $Li_2Si_2O_5$ $Li_2SiO_3$ $Li_3PO_4$ |
| $\sigma_B$/MPa | | 554 | 510 |
| Colour impression of the glass ceramic | yellow | yellow | yellow |

A yellow colouring was observed in glass ceramics of Examples 28 to 30 after irradiation and heat treatment.

Examples 31 to 53: Colour Change in a Glass Ceramic which Comprises Ce as Well as Au and Optionally Ag The compositions of Examples 31 and 32 included Ce and Au. In those of Examples 33 to 53, Ag was also included in addition to Ce and Au.

Lithium silicate glasses were prepared in a two-step melting process, wherein the first step was effected for 30 min at 1000° C. and the second step was effected for 60 min at 1450° C. The lithium silicate glasses were then subjected to a heat treatment for nucleation for 10 min at 480° C.

After a first heat treatment for crystallization, Examples 31 to 39 were subjected to an irradiation with an LED light source (LCS-0310-03-23 from Mightex Systems, ON, Canada) at 310 nm, 400 mA. The irradiated glass ceramics were subjected to a further heat treatment and the colour impression was determined.

Examples 31 and 32

These examples illustrate that a reddish colouring can be achieved by irradiation and heat treatment of a glass ceramic which comprises Ce and Au. A more intense red colouring could be achieved by a higher Au content.

Examples 33 to 35

These examples illustrate that a more intense colouring can be achieved by a longer heat treatment after the irradiation of a glass ceramic comprising Ce, Au and Ag. It could be observed in particular that a longer heat treatment brings about a stronger red colouring.

Examples 36 to 38

In these examples it was found that a higher temperature of the heat treatment following the irradiation effects a more intense colouring. In particular, a stronger red colouring was found at a higher temperature.

Examples 40 to 53 were first subjected to two heat treatments for crystallization and then irradiated with an LED light source (LCS-0310-03-23 from Mightex Systems, ON, Canada) at 310 nm, 400 mA. The irradiated glass ceramics were subjected to a further heat treatment and the colour impression was determined.

Examples 40 to 42

These examples illustrate that a more intense colouring, in particular a stronger red colouring, can be achieved by a longer heat treatment after the irradiation of a glass ceramic comprising Ce, Au and Ag.

Examples 42 to 44

In these examples it was found that a higher temperature of the heat treatment following the irradiation effects a more intense colouring in glass ceramics comprising Ce, Au and Ag. In particular, a stronger red colouring was found at a higher temperature.

Examples 45 to 47

The comparison of these examples with Examples 42 to 44 shows that a desired colour effect can be achieved if the heat treatment of the irradiated glass ceramic is effected for a shorter duration but at an increased temperature. A more intense colouring, in particular a stronger red colouring, could again be effected by a higher temperature.

Examples 48 to 50 and Examples 51 to 53

These examples illustrate that a more intense colouring can be effected by a longer irradiation duration. In particular, a stronger red colouring was observed in the case of a longer irradiation duration.

TABLE 10

| Example | 31 | 32 | 33 | 34 | 35 | 36 | 37 | 38 | 39 |
|---|---|---|---|---|---|---|---|---|---|
| 1st heat treatment | | | | | | | | | |
| Temperature/° C. | 900 | 900 | 900 | 900 | 900 | 900 | 900 | 900 | 820 |
| Duration/min | 60 | 60 | 60 | 60 | 60 | 60 | 60 | 60 | 10 |
| Irradiation of glass ceramic | | | | | | | | | |
| Radiation source | LED | LED | LED | LED | LED | LED | LED | LED | LED |
| Wavelength/nm | 310 | 310 | 310 | 310 | 310 | 310 | 310 | 310 | 310 |
| Duration/min | 15 | 15 | 15 | 60 | 15 | 15 | 15 | 15 | 15 |
| 2nd heat treatment | | | | | | | | | |
| Temperature/° C. | 600 | 600 | 600 | 600 | 600 | 650 | 600 | 550 | 600 |
| Duration/min | 15 | 15 | 15 | 20 | 30 | 10 | 10 | 10 | 10 |
| Crystal phases | $Li_2Si_2O_5$ $Li_3PO_4$ | $Li_2Si_2O_5$ $Li_3PO_4$ | | | | | | | |
| Colour impression of the glass ceramic | red-purple | pink | yellow-light orange | yellow-light red | yellow-red | red | yellow-red | yellow | light yellow |

TABLE 11

| Example | 40 | 41 | 42 | 43 | 44 | 45 | 46 | 47 | 48 |
|---|---|---|---|---|---|---|---|---|---|
| Irradiation of glass ceramic | | | | | | | | | |
| Radiation source | LED | LED | LED | LED | LED | LED | LED | LED | LED |
| Wavelength/nm | 310 | 310 | 310 | 310 | 310 | 310 | 310 | 310 | 310 |
| Duration/min | 15 | 15 | 15 | 15 | 15 | 15 | 15 | 15 | 15 |
| 3rd heat treatment | | | | | | | | | |
| Temperature/° C. | 650 | 650 | 650 | 700 | 600 | 850 | 800 | 750 | 800 |
| Duration /min | 45 | 30 | 15 | 15 | 15 | 1 | 1 | 1 | 1 |

TABLE 11-continued

| Example | 40 | 41 | 42 | 43 | 44 | 45 | 46 | 47 | 48 |
|---|---|---|---|---|---|---|---|---|---|
| Crystal phases | $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ |
| Colour impression of the glass ceramic | red-yellow | yellow-light | yellow-very light red | red-yellow | light yellow | pink | orange-pink | yellow | orange-pink |

TABLE 12

| Example | 49 | 50 | 51 | 52 | 53 |
|---|---|---|---|---|---|
| Irradiation of glass ceramic | | | | | |
| Radiation source | LED | LED | LED | LED | LED |
| Wavelength/nm | 310 | 310 | 310 | 310 | 310 |
| Duration/min | 10 | 5 | 15 | 10 | 5 |
| $3^{rd}$ heat treatment | | | | | |
| Temperature/° C. | 800 | 800 | 770 | 770 | 770 |
| Duration/min | 1 | 1 | 1 | 1 | 1 |
| Crystal phases | $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ |
| Colour impression of the glass ceramic | light orange-pink | very light orange-pink | light orange | yellow-orange | yellow-light orange |

Examples 54 to 74 and 76 to 78: Colour Change in a Glass Ceramic by Irradiation with an LED and Heat Treatment The glasses of these examples were first subjected to a heat treatment for nucleation and a heat treatment for crystallization. The glass ceramics were irradiated with an LED light source (LCS-0310-03-23 from Mightex Systems, ON, Canada) and subjected to a further heat treatment.

These examples illustrate that a colour change can be effected by means of irradiation and heat treatment in glass ceramics with clearly different compositions, e.g. with low (Example 54) or high (Example 55) $P_2O_5$ content, high Ce and Ag content (Example 57) or with $ZrO_2$ content (Example 61).

Examples 71 and 77

These examples illustrate that the colour change effected by irradiation and heat treatment can be combined with other colouring processes. The $Er_2O_3$ present in the compositions of Examples 71 and 77 led in the glass ceramic produced to a slight red colouring, although the overall impression of the glass ceramic irradiated and heat-treated according to the invention was yellow. The red colouring of the glass ceramics of Examples 71 and 77 was quantified by a determination of the a* values. The a* values were increased compared with glass ceramics which included no red colouring component, such as Example 70.

Example 78

The examination of the chemical resistance according to ISO 6872 (2008) of the glass ceramic according to Example 78 resulted in an acid solubility of 18 μg/cm².

Examples 80 to 90: Colour Change in Low Quartz and Lithium Aluminosilicate Glass Ceramics The glasses were produced in a two-step melting process and subjected to a heat treatment for nucleation. After a heat treatment for crystallization, a colour change was carried out by irradiation and heat treatment and the obtained crystal phases were determined.

The examples illustrate that a colour change can also be effected by irradiation and heat treatment in glass ceramics which have low quartz or lithium aluminosilicate as main crystal phase.

TABLE 13

| Example | 54 | 55 | 56 | 57 | 58 | 59 |
|---|---|---|---|---|---|---|
| $T_g$/° C. | 455.5 | 474.7 | 461.9 | | | |
| $T_{S1}$/° C. | 1400 | 1400 | 1400 | 1450 | 1400 | 1400 |
| $t_{S1}$/min | 60 | 60 | 60 | 30 | 60 | 60 |
| $T_{S2}$/° C. | | | | 1650 | | |
| $t_{S2}$/min | | | | 30 | | |
| $T_N$/° C. | 490 | 490 | 540 | 480 | 480 | 490 |
| $t_N$/min | 10 | 10 | 10 | 10 | 10 | 10 |
| $1^{st}$ heat treatment | | | | | | |
| Temperature/° C. | 840 | 820 | 820 | 900 | 810 | 850 |
| Duration/min | 15 | 15 | 30 | 60 | 10 | 10 |

TABLE 13-continued

| Irradiation of glass ceramic | | | | | | |
|---|---|---|---|---|---|---|
| Radiation source | LED | LED | LED | LED | LED | LED |
| Wavelength/nm | 310 | 310 | 310 | 310 | 310 | 310 |
| Duration/min | 15 | 15 | 15 | 15 | 15 | 15 |
| Intensity/mA | 400 | 400 | 400 | 400 | 400 | 400 |
| $2^{nd}$ heat treatment | | | | | | |
| Temperature/° C. | 550 | 550 | 550 | 550 | 550 | 550 |
| Duration/min | 15 | 15 | 15 | 15 | 15 | 60 |
| $3^{rd}$ heat treatment | | | | | | |
| Temperature/° C. | | | | 550 | | |
| Duration/min | | | | 45 | | |
| Crystal phases | $Li_2SiO_3$ cristobalite | $Li_2Si_2O_5$ $Li_2SiO_3$ $Li_3PO_4$ cristobalite | $Li_2Si_2O_5$ $Li_3PO_4$ $WP_2O_7$ $Li_2WO_4$ | $Li_2Si_2O_5$ $Li_3PO_4$ | $Li_2Si_2O_5$ $Li_3PO_4$ $Li_2SiO_3$ cristobalite | $Li_2Si_2O_5$ $Li_3PO_4$ $Li_2SiO_3$ cristobalite |
| Colour impression of the glass ceramic | yellow | yellow | orange-brown | yellow | yellow-brown | yellow |

| Example | 60 | 61 | 62 | 63 | 64 | 65 |
|---|---|---|---|---|---|---|
| $T_g$/° C. | | | 453.3 | 451.7 | 450.4 | 452.2 |
| $T_{S1}$/° C. | 1400 | 1400 | 1400 | 1400 | 1400 | 1400 |
| $t_{S1}$/min | 60 | 60 | 60 | 60 | 60 | 60 |
| $T_{S2}$/° C. | | | | | | |
| $t_{S2}$/min | | | | | | |
| $T_N$/° C. | 500 | 500 | 480 | 470 | 470 | 470 |
| $t_N$/min | 10 | 10 | 10 | 10 | 10 | 10 |
| $1^{st}$ heat treatment | | | | | | |
| Temperature/° C. | 800 | 840 | 700 | 830 | 810 | 780 |
| Duration/min | 10 | 10 | 30 | 30 | 30 | 30 |
| Irradiation of glass ceramic | | | | | | |
| Radiation source | LED | LED | LED | LED | LED | LED |
| Wavelength/nm | 310 | 310 | 310 | 310 | 310 | 310 |
| Duration/min | 15 | 15 | 15 | 15 | 15 | 15 |
| Intensity/mA | 400 | 400 | 400 | 400 | 400 | 400 |
| $2^{nd}$ heat treatment | | | | | | |
| Temperature/° C. | 550 | 550 | 550 | 550 | 550 | 600 |
| Duration/min | 60 | 15 | 60 | 60 | 60 | 60 |
| $3^{rd}$ heat treatment | | | | | | |
| Temperature/° C. | | | | | | |
| Duration/min | | | | | | |
| Crystal phases | $Li_2Si_2O_5$ $Li_3PO_4$ $Li_2SiO_3$ | $Li_2Si_2O_5$ $Li_3PO_4$ $Li_2SiO_3$ cristobalite | $Li_2Si_2O_5$ $Li_2SiO_3$ | $Li_2Si_2O_5$ $Li_3PO_4$ $Li_2SiO_3$ LiSr($PO_4$) | $Li_2Si_2O_5$ $Li_3PO_4$ | |
| Colour impression of the glass ceramic | yellow | yellow | yellow | yellow | yellow | yellow |

TABLE 14

| Example | 66 | 67 | 68 | 69 | 70 | 71 | 72 |
|---|---|---|---|---|---|---|---|
| $T_g$/° C. | | 464.4 | 475 | 474.6 | | 463 | 459 |
| $T_{S1}$/° C. | 1400 | 1400 | 1500 | 1500 | 1450 | 1450 | 1450 |
| $t_{S1}$/min | 60 | 60 | 30 | 30 | 120 | 120 | 120 |
| $T_{S2}$/° C. | | | 1650 | 1650 | | | |
| $t_{S2}$/min | | | 30 | 30 | | | |
| $T_N$/° C. | 490 | 490 | 490 | 490 | 470 | 480 | 480 |
| $t_N$/min | 10 | 10 | 10 | 10 | 10 | 10 | 10 |
| $1^{st}$ heat treatment | | | | | | | |
| Temperature/° C. | 900 | 900 | 800 | 800 | 640 | 840 | 840 |
| Duration/min | 60 | 60 | 30 | 30 | 30 | 15 | 30 |

TABLE 14-continued

| Irradiation of glass ceramic | | | | | | | |
|---|---|---|---|---|---|---|---|
| Radiation source | LED | LED | LED | LED | LED | LED | LED |
| Wavelength/nm | 310 | 310 | 310 | 310 | 310 | 310 | 310 |
| Duration/min | 15 | 15 | 15 | 15 | 15 | 20 | 60 |
| Intensity/mA | 400 | 400 | 400 | 400 | 400 | 400 | 400 |
| $2^{nd}$ heat treatment | | | | | | | |
| Temperature/° C. | 550 | 550 | 550 | 550 | 640 | 650 | 650 |
| Duration/min | 15 | 15 | 60 | 15 | 5 | 30 | 15 |
| Crystal phases | $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ α-quartz cristobalite | $Li_2SiO_3$ $Li_3PO_4$ | | $Li_2Si_2O_5$ $Li_3PO_4$ |
| $\sigma_B$/MPa | | | | | 314 | | 327 |
| CR (translucency) | | | | | 75.59 | 84.61 | |
| L* | | | | | 91.8 | 86.43 | |
| a* | | | | | −2.8 | 2.6 | |
| b* | | | | | 20.65 | 25.06 | |
| Colour impression of the glass ceramic | brown | brown | yellow-light brown | light yellow | yellow | yellow | yellow |

| | Example | 73 | 74 | 76 | 77 | 78 |
|---|---|---|---|---|---|---|
| | $T_g$/° C. | 456 | 465 | | 471.2 | 462.7 |
| | $T_{S1}$/° C. | 1550 | 1500 | 1450 | 1450 | 1450 |
| | $t_{S1}$/min | 120 | 120 | 300 | 120 | 120 |
| | $T_{S2}$/° C. | | | | | |
| | $t_{S2}$/min | | | | | |
| | $T_N$/° C. | 470 | 480 | 490 | 490 | 490 |
| | $t_N$/min | 10 | 0 | 60 | 60 | 10 |
| | $1^{st}$ heat treatment | | | | | |
| | Temperature/° C. | 710 | 750 | 750 | 750 | 850 |
| | Duration/min | 30 | 60 | 30 | 30 | 30 |
| | Irradiation of glass ceramic | | | | | |
| | Radiation source | LED | LED | LED | LED | LED |
| | Wavelength/nm | 310 | 310 | 310 | 310 | 310 |
| | Duration/min | 5 | 30 | 30 | 30 | 15 |
| | Intensity/mA | 400 | 400 | 400 | 400 | 400 |
| | $2^{nd}$ heat treatment | | | | | |
| | Temperature/° C. | 710 | 750 | 600 | 550 | 850 |
| | Duration/min | 30 | 5 | 15 | 60 | 60 |
| | Crystal phases | $Li_2Si_2O_5$ $Li_3PO_4$ cristobalite | $Li_2Si_2O_5$ $Li_3PO_4$ α-quartz | $Li_2Si_2O_5$ $Li_3PO_4$ α-quartz | $Li_2Si_2O_5$ $Li_3PO_4$ α-quartz | $Li_2Si_2O_5$ $Li_3PO_4$ $Li_2SiO_3$ |
| | $\sigma_B$/MPa | | | | 207 | |
| | CR (translucency) | | 66.09 | 64.24 | 64.5 | |
| | L* | | 91.52 | 90.89 | 86.71 | |
| | a* | | 0.89 | −2.09 | 1.44 | |
| | b* | | 17.03 | 12.76 | 16.92 | |
| | Colour impression of the glass ceramic | yellow-grey | yellow | yellow | yellow | yellow |

TABLE 15

| Example | 80 | 81 | 82 | 83 | 84 | 85 |
|---|---|---|---|---|---|---|
| $T_g$/° C. | 476.7 | | | 471.2 | 476.6 | 469 |
| $T_{S1}$/° C. | 1500 | 1500 | 1500 | 1500 | 1500 | 1500 |
| $t_{S1}$/min | 30 | 30 | 15 | 30 | 30 | 30 |
| $T_{S2}$/° C. | 1650 | 1650 | 1650 | 1650 | 1650 | 1650 |
| $t_{S2}$/min | 30 | 30 | 45 | 30 | 30 | 30 |
| $T_N$/° C. | 500 | 490 | 490 | 500 | 520 | 490 |
| $t_N$/min | 10 | 0 | 0 | 10 | 10 | 10 |
| $1^{st}$ heat treatment | | | | | | |
| Temperature/° C. | 830 | 750 | 750 | 800 | 780 | 730 |
| Duration/min | 60 | 30 | 30 | 60 | 60 | 60 |

TABLE 15-continued

| Irradiation of glass ceramic | | | | | | |
|---|---|---|---|---|---|---|
| Radiation source | LED | LED | LED | LED | LED | LED |
| Wavelength/nm | 310 | 310 | 310 | 310 | 310 | 310 |
| Duration/min | 15 | 15 | 15 | 15 | 15 | 15 |
| Intensity/mA | 400 | 400 | 400 | 400 | 400 | 400 |
| $2^{nd}$ heat treatment | | | | | | |
| Temperature/° C. | 550 | 550 | 550 | 550 | 550 | 550 |
| Duration/min | 10 | 15 | 15 | 15 | 10 | 15 |
| Crystal phases | α-quartz $Li_2Si_2O_5$ $Li_3PO_4$ | α-quartz $Li_2Si_2O_5$ $Li_3PO_4$ | α-quartz $Li_2Si_2O_5$ $Li_3PO_4$ | α-quartz $Li_2Si_2O_5$ $Li_3PO_4$ | α-quartz $Li_2Si_2O_5$ $Li_3PO_4$ | α-quartz $Li_2Si_2O_5$ $Li_3PO_4$ $Ca_2Al_2SiO_7$ |
| Colour impression of the glass ceramic | yellow | yellow | yellow | yellow | yellow | yellow |

| Example | 86 | 87 | 88 | 89 | 90 |
|---|---|---|---|---|---|
| $T_g$/° C. | 467.9 | 467.3 | 475.6 | 486.8 | 480.6 |
| $T_{S1}$/° C. | 1500 | 1500 | 1500 | 1500 | 1500 |
| $t_{S1}$/min | 30 | 30 | 30 | 30 | 30 |
| $T_{S2}$/° C. | 1650 | 1650 | 1650 | 1650 | 1650 |
| $t_{S2}$/min | 30 | 30 | 30 | 30 | 30 |
| $T_N$/° C. | 490 | 490 | 500 | 490 | 500 |
| $t_N$/min | 10 | 10 | 10 | 10 | 10 |
| $1^{st}$ heat treatment | | | | | |
| Temperature/° C. | 800 | 750 | 800 | 830 | 800 |
| Duration/min | 60 | 10 | 60 | 60 | 60 |
| Irradiation of glass ceramic | | | | | |
| Radiation source | LED | LED | LED | LED | LED |
| Wavelength/nm | 310 | 310 | 310 | 310 | 310 |
| Duration/min | 15 | 15 | 15 | 15 | 15 |
| Intensity/mA | 400 | 400 | 400 | 400 | 400 |
| $2^{nd}$ heat treatment | | | | | |
| Temperature/° C. | 550 | 550 | 550 | 550 | 550 |
| Duration/min | 15 + 45 | 10 | 10 | 15 | 15 |
| Crystal phases | α-quartz $Li_2Si_2O_5$ $Li_3PO_4$ | α-quartz $Li_2Si_2O_5$ $Li_3PO_4$ cristo-balite | $Li_{0.155}$— $Al_{0.155}$— $Si_{0.845}O_2$ $Li_2Si_2O_5$ $Li_3PO_4$ | α-quartz $Li_2Si_2O_5$ $Li_3PO_4$ | α-quartz $Li_2Si_2O_5$ $Li_3PO_4$ cristo-balite |
| Colour impression of the glass ceramic | yellow | light yellow | yellow | yellow | light yellow |

Example 91: Colour Change by Irradiation with X-Radiation and Heat Treatment A glass ceramic was prepared according to Example 74, with the difference that the nucleation duration $t_N$ was 10 min. After the heat treatment for crystallization, $Li_2Si_2O_5$ was determined as main crystal phase, and $Li_3PO_4$ and low quartz were determined as secondary crystal phases. The glass ceramic was irradiated for 2 hours with Cu—$K_α$ radiation using an X-ray diffractometer (D8 Advance, Bruker, Karlsruhe, Germany) with an operating voltage of 40 kV. After the irradiation with the high-energy radiation, which is already accompanied by a heat effect, a slight yellow colouring of the glass ceramic was already observed. The yellow colouring was intensified by the subsequent heat treatment (750° C., 10 min).

Examples 92 to 110: Colour Change by a One-Step Colouring Process

The glasses were prepared in a two-step melting process and subjected to a heat treatment for nucelation. The glasses of the examples 92 to 99 were subjected to two heat treatments and the glasses of the examples 100 to 110 were subjected to one heat treatment for crystallisation to prepare glass ceramics.

In the glass ceramics a colour change was effected in a one-step process by heating the glass ceramics to a temperature in the range of 200 to 800° C. and irradiating them in the heated state. The parameters of the heat treatments and of the colour changing process as well as the resulting colours and the crystal phases determined in the coloured glass ceramics are given in tables 15 A and 15 B.

The examples illustrate that a colour change can be effected in glass ceramics by irradiating and heat treatment also in a one step process, in which the heated glass ceramics are irradiated.

Moreover, the examples show that by means of one-step colouring processes yellow colouring or the red or pink colouring can be effected in glass ceramics. For achieving the yellow colouring typically lower temperatures are sufficient than for achieving the red colouring. The intensity of the colouring can be controlled for example by means of the amount of Ag, Au and/or Ce as well as the temperature during irradiating.

TABLE 15A

| Example | 92 | 93 | 94 | 95 | 96 | 97 | 98 | 99 | 100 | 101 |
|---|---|---|---|---|---|---|---|---|---|---|
| $T_g$/°C | | | | | | | | | | 473.5 |
| $T_{S1}$/°C | 1500 | 1500 | 1500 | 1500 | 1500 | 1500 | 1000 | 1500 | 1500 | 1500 |
| $t_{S1}$/min | 60 | 60 | 60 | 60 | 60 | 60 | 30 | 60 | 15 | 30 |
| $T_{S2}$/°C | 1500 | 1500 | 1500 | 1500 | 1500 | 1500 | 1450 | 1500 | 1650 | 1650 |
| $t_{S2}$/min | 60 | 60 | 60 | 60 | 60 | 60 | 60 | 60 | 45 | 30 |
| $T_N$/°C | 480 | 470 | 460 | 460 | 490 | 510 | 480 | 460 | 490 | 490 |
| $t_N$/min | 10 | 10 | 30 | 30 | 10 | 10 | 10 | 30 | 0 | 10 |
| 1. Heat treatment | | | | | | | | | | |
| Temperature/°C | 590 | 630 | 600 | 700 | 600 | 600 | 550 | 630 | 750 | 810 |
| Duration/min | 40 | 15 | 30 | 10 | 20 | 20 | 60 | 35 | 30 | 30 |
| 2. Heat treatment | | | | | | | | | | |
| Temperature/°C | 780 | 880 | 830 | 870 | 780 | 800 | 850 | 810 | | |
| Duration/min | 15 | 1 | 5 | 2 | 10 | 10 | 7 | 7 | | |
| Irradiation of Glass ceramic | | | | | | | | | | |
| Radiation source | LED | LED | LED | LED | LED | LED | LED | LED | LED | LED |
| Wavelength/nm | 310 | 310 | 310 | 310 | 310 | 310 | 310 | 310 | 310 | 310 |
| Intensity/mA | 400 | 400 | 400 | 400 | 400 | 400 | 400 | 400 | 400 | 400 |
| Duration/min | 10 | 10 | 10 | 10 | 10 | 10 | 10 | 10 | 10 | 10 |
| Temperature/°C | 600 | 500 | 400 | 500 | 800 | 600 | 500 | 400 | 300 | 400 |
| Crystal phases | $Li_2Si_2O_5$ Cristo-balite $Li_3PO_4$ $LiAlSi_2O_6$ | $Li_2Si_2O_5$ $Li_3PO_4$ | $Li_2Si_2O_5$ $Li_3PO_4$ | $Li_2Si_2O_5$ $Li_2SiO_3$ $Li_3PO_4$ | $Li_2Si_2O_5$ $Li_3PO_4$ $Li_xAl_xSi_{3-x}O_6$ (Virgilit) $Li_2SiO_3$ | $Li_2Si_2O_5$ $Li_3PO_4$ β-Quartz Cristo-balite | $Li_2Si_2O_5$ $Li_3PO_4$ | $Li_2Si_2O_5$ $Li_3PO_4$ | $Li_2Si_2O_5$ $Li_3PO_4$ α-Quartz | $Li_2Si_2O_5$ $Li_3PO_4$ |
| Colour impression of Glass ceramic | yellow | yellow | yellow | intense yellow | yellow | yellow | yellow | yellow | dark yellow | yellow |

TABLE 15B

| Example | 102 | 103 | 104 | 105 | 106 | 107 | 108 | 109 | 110 |
|---|---|---|---|---|---|---|---|---|---|
| $T_g$/°C | 476.7 | | 466.3 | 471.1 | | | | | |
| $T_{S1}$/°C | 1500 | 1500 | 1500 | 1500 | 1000 | 1000 | 1000 | 1000 | 1000 |
| $t_{S1}$/min | 30 | 15 | 30 | 15 | 30 | 30 | 30 | 30 | 30 |
| $T_{S2}$/°C | 1650 | 1650 | 1650 | 1650 | 1450 | 1450 | 1450 | 1450 | 1450 |
| $t_{S2}$/min | 30 | 45 | 30 | 45 | 60 | 60 | 60 | 60 | 60 |
| $T_N$/°C | 500 | 490 | 490 | 480 | 480 | 480 | 480 | 480 | 480 |
| $t_N$/min | 10 | 0 | 10 | 0 | 10 | 10 | 10 | 10 | 10 |
| 1. Heat treatment | | | | | | | | | |
| Temperature/°C | 830 | 750 | 730 | 780 | 900 | 900 | 900 | 900 | 700 |
| Duration/min | 60 | 30 | 30 | 30 | 60 | 60 | 60 | 60 | 10 |
| Irradiation of Glass ceramic | | | | | | | | | |
| Radiation source | LED | LED | LED | LED | LED | LED | LED | LED | LED |
| Wavelength/nm | 310 | 310 | 310 | 310 | 310 | 310 | 310 | 310 | 310 |
| Intensity/mA | 400 | 400 | 400 | 400 | 400 | 400 | 400 | 400 | 400 |
| Duration/min | 10 | 10 | 10 | 10 | 15 | 15 | 15 | 15 | 15 |
| Temperature/°C | 300 | 400 | 200 | 200 | 700 | 700 | 700 | 600 | 700 |
| Crystal phases | α-Quartz $Li_2Si_2O_5$ $Li_3PO_4$ | α-Quartz $Li_2Si_2O_5$ $Li_3PO_4$ | α-Quartz $Li_2Si_2O_5$ $Li_3PO_4$ | α-Quartz $Li_2Si_2O_5$ $Li_3PO_4$ | $Li_2Si_2O_5$ $Li_3PO_4$ | $Li_2Si_2O_5$ $Li_3PO_4$ | $Li_2Si_2O_5$ $Li_3PO_4$ | | $Li_2SiO_3$ |
| Colour impression of Glass ceramic | yellow | dark yellow | light yellow | light yellow | pink | light pink | intense yellow | yellow | pink |

Example 111: Preparation of a Multi-Coloured Glass Ceramic in a Three-Step Colouring Process A glass was prepared according to example 40, heated for 10 min at 480° C. for nucleation and then subjected to two heat treatments for crystallisation. The first heat treatment was performed for 60 min at 550° C. and the second heat treatment for 7 min at 850° C.

The glass ceramic was then subjected to a three-step colouring process. First of all, a red colouring was effected by irradiating (310 nm LED, 400 mA) the glass ceramic in a first step for 15 minutes at 100° C. and subsequently in a second step subjecting it to a heat treatment. The heat treatment was conducted for 10 min at 850° C. and the heating rate and the cooling rate were each 60 K min$^{-1}$. In a third step a yellow colouring was additionally achieved in the red coloured glass ceramic. For this purpose, the glass ceramic was in a similar way as in examples 91 to 109 irradiated (310 nm LED, 400 mA) for 10 min at 500° C. Different areas of the glass ceramic were at least in part subjected to the first and the second irradiation.

The resulting glass ceramic showed after the third step a red colouring as well as a yellow colouring, wherein the differently irradiated parts of the glass ceramic showed different colors. In the multi-coloured glass ceramic the crystal phases lithium disilicate ($Li_2Si_2O_5$) and lithium phosphate ($Li_3PO_4$) were determined.

Comparison Examples 75 and 79: No Irradiation of the Glass or the Glass Ceramic

The lithium silicate glasses of Comparison Examples 75 and 79 were subjected to a heat treatment for nucleation and a heat treatment for crystallization. Unlike the glasses and glass ceramics which were additionally exposed to an irradiation and heat treatment, e.g. the glass ceramic produced in Comparison Example 75 was uncoloured.

TABLE 16

| Example | 75 | 79 |
| --- | --- | --- |
| $T_g$/° C. | 465 | 462.7 |
| $T_{S1}$/° C. | 1500 | 1450 |
| $t_{S1}$/min | 120 | 120 |
| $T_N$/° C. | 480 | 490 |
| $t_N$/min | 10 | 10 |
| $1^{st}$ heat treatment | | |
| Temperature/° C. | 750 | 840 |
| Duration/min | 30 | 30 |
| Crystal phases | $Li_2Si_2O_5$ | $Li_2Si_2O_5$ |
| | $Li_3PO_4$ | $Li_3PO_4$ |
| | α-quartz | $Li_2SiO_3$ |
| $\sigma_B$/MPa | 331 | |
| Colour impression of the glass ceramic | uncoloured | uncoloured |

The glass ceramic according to Comparison Example 79, precisely like the glass ceramic according to Example 74, had a fracture toughness of 2.46 MPa $m^{0.5}$ (determined as $K_{IC}$ value according to the SEVNB method, described in ISO 6872 from 2008).

The invention claimed is:

1. A process for the preparation of a multi-coloured dental restoration, which process comprises
    a) giving a glass or a glass ceramic the shape of a dental restoration, and
    b) irradiating at least one part of the glass or the glass ceramic with artificial electromagnetic radiation and subjecting this irradiated part to a heat treatment to effect a colour change in at least one part,
    wherein the glass and the glass ceramic comprise at least one oxidizable component, at least one reducible colouring component, and $P_2O_5$ and
    wherein the radiation has a wavelength in the range of 100 to 360 nm.

2. The process according to claim 1, in which the irradiating and the heat treatment in step b) is performed in one step.

3. The process according to claim 1, in which the glass or the glass ceramic comprise Ce, calculated as $CeO_2$.

4. The process according to claim 1, in which the glass or the glass ceramic comprise Ag, calculated as $Ag_2O$.

5. The process according to claim 1, in which the glass or the glass ceramic comprise Au, calculated as $Au_2O$.

6. The process according to claim 1, in which the glass or the glass ceramic comprise Ce as well as Ag and/or Au.

7. The process according to claim 1, in which the glass or the glass ceramic comprise Cl, Br and/or I in an amount of 0.0001 to 0.9 wt.-%.

8. The process according to claim 1, in which the glass or the glass ceramic comprise $P_2O_5$ in an amount of 0.5 to 11.0 wt.-%.

9. The process according to claim 1, in which the glass or the glass ceramic comprise 1.0 to 12.0 wt.-% $K_2O$.

10. The process according to claim 1, in which the glass or the glass ceramic comprise 0 to 14.0 wt.-% $Al_2O_3$.

11. The process according to claim 1, in which the glass or the glass ceramic comprise at least one of the following components in the amounts given:

| Component | wt.-% |
| --- | --- |
| $SiO_2$ | 61.0-88.0 |
| $Li_2O$ | 5.0-24.0 |
| $Al_2O_3$ | 0-14.0 |
| $P_2O_5$ | 0.5-11.0 |
| Ce, calculated as $CeO_2$ | 0.01-1.5 |
| Ag, calculated as $Ag_2O$ | 0.0005-1.3 |
| Au, calculated as $Au_2O$ | 0.0001-0.65. |

12. The process according to claim 1, which comprises effecting the heat treatment at a temperature in the range of 300 to 1000° C.

13. The process according to claim 1, which comprises effecting the heat treatment for a duration of up to 120 min.

14. The process according to claim 1, which comprises effecting heating the at least one part of the glass ceramic to at least 150° C. and irradiating the at least one part of the glass ceramic at this temperature to effect the colour change.

15. The process according to claim 1, which comprises first subjecting at least one part of the glass ceramic at a temperature $T_1$ to a first irradiating and then subjecting the at least one part at a temperature $T_2$ to a first heat treatment to effect the colour change in the at least one part of the glass ceramic, and then subjecting the at least one part or another part of the glass ceramic at a temperature $T_3$ to a second irradiating and simultaneously a second heat treatment, wherein $T_1 < T_2$ and $T_3 < T_2$.

16. The process according to claim 1, which comprises effecting a yellow colouring in at least one part of the glass or the glass ceramic and effecting a red colouring in another part of the glass or the glass ceramic.

17. The process according to claim 1 in which the glass or the glass ceramic are selected from the group consisting of lithium silicate glass, lithium aluminosilicate glass, lithium silicate glass ceramic, lithium aluminosilicate glass ceramic and quartz glass ceramic.

18. The process according to claim 17, in which the glass ceramic comprises lithium metasilicate, lithium disilicate, low quartz or lithium aluminosilicate as main crystal phase.

19. The process according to claim 1, in which the glass consists of only one glass and the glass ceramic consists of only one glass ceramic.

20. The process according to claim 1, in which the glass or the glass ceramic are given the shape of the dental restoration by pressing or machining.

21. The process according to claim 20, which comprises effecting the machining in a CAD/CAM process.

22. The process according to claim 1, in which the dental restoration is a bridge, an inlay, an onlay, a veneer, an abutment, a partial crown, a crown or a facet.

* * * * *